US011952954B2

(12) United States Patent
Blumreiter et al.

(10) Patent No.: US 11,952,954 B2
(45) Date of Patent: Apr. 9, 2024

(54) FUEL AGNOSTIC COMPRESSION IGNITION ENGINE

(71) Applicant: ClearFlame Engines, Inc., Geneva, IL (US)

(72) Inventors: Julie Blumreiter, Batavia, IL (US); Bernard Johnson, Chicago, IL (US); Robert Schanz, Aurora, IL (US)

(73) Assignee: ClearFlame Engines, Inc., Geneva, IL (US)

( * ) Notice: Subject to any disclaimer, the term of this patent is extended or adjusted under 35 U.S.C. 154(b) by 0 days.

(21) Appl. No.: 18/114,455

(22) Filed: Feb. 27, 2023

(65) Prior Publication Data
US 2023/0212997 A1 Jul. 6, 2023

Related U.S. Application Data

(63) Continuation of application No. 17/863,481, filed on Jul. 13, 2022, which is a continuation of application
(Continued)

(51) Int. Cl.
*F02D 41/30* (2006.01)
*F02B 1/14* (2006.01)
(Continued)

(52) U.S. Cl.
CPC ........... *F02D 41/3035* (2013.01); *F02B 1/14* (2013.01); *F02B 43/12* (2013.01);
(Continued)

(58) Field of Classification Search
CPC ............ F02D 41/3035; F02D 41/0027; F02D 41/005; F02D 41/0057; F02D 41/009;
(Continued)

(56) References Cited

U.S. PATENT DOCUMENTS

| 4,416,229 A | 11/1983 | Wood |
| 4,444,166 A | 4/1984 | Kovacs et al. |

(Continued)

FOREIGN PATENT DOCUMENTS

| DE | 102017005474 A1 | 12/2018 |
| EP | 0116197 A2 | 8/1984 |

(Continued)

OTHER PUBLICATIONS

Dhinagar, S.J. et al. (1995) "Spark-Assisted Alcohol Operation in a Low Heat Rejection Engine" International Congress and Exposition, Detroit, MI, Feb. 27-Mar. 2, 1995. Society of Automotive Engineers (SAE) Technical Paper Series, Paper No. 950059; 11 pages.

Fleisch, T. et al. (1995) "A New Clean Diesel Technology: Demonstration of ULEV Emissions on a Navistar Diesel Engine Fueled with Dimethyl Ether" International Congress and Exposition, Detroit, MI, Feb. 27-Mar. 2, 1995. Society of Automotive Engineers (SAE) Technical Paper Series, Paper No. 950061; 14 pages.
(Continued)

Primary Examiner — Joseph J Dallo
(74) Attorney, Agent, or Firm — COOLEY LLP

(57) ABSTRACT

Some embodiments described herein relate to a method of operating a compression ignition engine. The method of operating the compression ignition engine includes opening an intake valve to draw a volume of air into a combustion chamber, closing an intake valve, and moving a piston from a bottom-dead-center (BDC) position to a top-dead-center (TDC) position in the combustion chamber at a compression ratio of at least about 15:1. The method further includes injecting a volume of fuel into the combustion chamber at an engine crank angle between about 330 degrees and about 365 degrees during a first time period. The fuel has a cetane number less than about 40. The method further includes combusting substantially all of the volume of fuel. In some embodiments, a delay between injecting the volume of fuel into the combustion chamber and initiation of combustion is less than about 2 ms.

30 Claims, 3 Drawing Sheets

Related U.S. Application Data

No. 17/477,106, filed on Sep. 16, 2021, now Pat. No. 11,428,186, which is a continuation of application No. PCT/US2021/019930, filed on Feb. 26, 2021.

(60) Provisional application No. 62/981,808, filed on Feb. 26, 2020.

(51) Int. Cl.
| | |
|---|---|
| *F02B 43/12* | (2006.01) |
| *F02D 41/00* | (2006.01) |
| *F02D 41/40* | (2006.01) |
| *F02M 27/02* | (2006.01) |
| *F02B 43/10* | (2006.01) |
| *F02D 41/38* | (2006.01) |

(52) U.S. Cl.
CPC ....... *F02D 41/0027* (2013.01); *F02D 41/005* (2013.01); *F02D 41/0057* (2013.01); *F02D 41/009* (2013.01); *F02D 41/401* (2013.01); *F02M 27/02* (2013.01); *F02B 2043/103* (2013.01); *F02D 2041/389* (2013.01); *F02D 2200/0414* (2013.01); *F02D 2200/0611* (2013.01)

(58) Field of Classification Search
CPC ............. F02D 41/401; F02D 2041/389; F02D 2200/0414; F02D 2200/0611; F02B 1/14; F02B 43/12; F02B 2043/103; F02M 27/02

See application file for complete search history.

(56) References Cited

U.S. PATENT DOCUMENTS

| | | | |
|---|---|---|---|
| 5,095,872 A | 3/1992 | Kawamura | |
| 5,136,994 A | 8/1992 | Gale | |
| 5,230,309 A | 7/1993 | Suga et al. | |
| 5,417,189 A | 5/1995 | Regueiro | |
| 5,692,468 A | 12/1997 | Haman et al. | |
| 5,768,887 A | 6/1998 | Nakamura et al. | |
| 6,158,413 A | 12/2000 | Kimura et al. | |
| 6,267,097 B1 | 7/2001 | Urushihara et al. | |
| 6,340,003 B1 | 1/2002 | Schoubye et al. | |
| 6,401,688 B2 | 6/2002 | Teraji et al. | |
| 6,435,159 B1 | 8/2002 | Craft et al. | |
| 6,530,209 B2 | 3/2003 | Kuwabara et al. | |
| 6,557,520 B2 | 5/2003 | Roberts, Jr. | |
| 6,612,294 B2 | 9/2003 | Hiraya et al. | |
| 6,814,059 B2 | 11/2004 | Ito et al. | |
| 6,858,048 B1 | 2/2005 | Jimeson et al. | |
| 6,966,295 B2 | 11/2005 | Yamaoka et al. | |
| 6,971,365 B1 | 12/2005 | Najt et al. | |
| 7,017,561 B1 | 3/2006 | Liu et al. | |
| 7,047,933 B2 | 5/2006 | Gray, Jr. | |
| 7,059,281 B2 | 6/2006 | Kuo et al. | |
| 7,213,564 B2 | 5/2007 | Hill et al. | |
| 7,363,911 B2 | 4/2008 | Brehob | |
| 7,370,626 B2 | 5/2008 | Schubert | |
| 7,387,104 B2 | 6/2008 | Sulkowski | |
| 7,461,628 B2 | 12/2008 | Blumberg et al. | |
| 7,559,961 B2 | 7/2009 | Jimeson et al. | |
| 7,621,262 B2 | 11/2009 | Zubeck | |
| 7,743,754 B2 | 6/2010 | Cheiky | |
| 7,770,545 B2 | 8/2010 | Morgenstern | |
| 7,909,019 B2 | 3/2011 | Stein | |
| 7,971,567 B2 | 7/2011 | Zubeck et al. | |
| 8,006,672 B2 | 8/2011 | Krenus et al. | |
| 8,028,678 B2 | 10/2011 | Stein | |
| 8,141,356 B2 | 3/2012 | Leone et al. | |
| 8,235,024 B2 | 8/2012 | Zubeck et al. | |
| 8,245,690 B2 | 8/2012 | Stein | |
| 8,327,823 B2 | 12/2012 | Courtoy et al. | |
| 8,327,831 B2 | 12/2012 | Sturman | |
| 8,352,166 B2 | 1/2013 | Surnilla et al. | |
| 8,353,270 B2 | 1/2013 | Ulrey et al. | |
| 8,359,168 B2 | 1/2013 | Lepsch et al. | |
| 8,365,701 B1 | 2/2013 | Sturman | |
| 8,495,974 B2 | 7/2013 | Agosta | |
| 8,495,983 B2 | 7/2013 | Zubeck et al. | |
| 8,555,852 B2 | 10/2013 | Munshi et al. | |
| 8,590,505 B2 | 11/2013 | Simmons et al. | |
| 8,590,506 B2 | 11/2013 | Lee et al. | |
| 8,646,437 B2 | 2/2014 | Sales | |
| 8,689,767 B1 * | 4/2014 | Dec | F02D 41/0025 123/305 |
| 8,783,227 B2 | 7/2014 | Yamakawa et al. | |
| 8,838,364 B2 * | 9/2014 | Nagatsu | F02D 41/3836 123/294 |
| 8,875,685 B2 | 11/2014 | McNeil | |
| 8,904,994 B2 | 12/2014 | Michikawauchi et al. | |
| 8,935,996 B2 | 1/2015 | Mulye | |
| 8,944,036 B2 | 2/2015 | Klingbeil | |
| 8,997,698 B1 * | 4/2015 | Roth | F01P 3/08 123/41.35 |
| 9,038,608 B2 | 5/2015 | Vigild et al. | |
| 9,046,064 B2 | 6/2015 | Sales | |
| 9,097,219 B2 | 8/2015 | Sales | |
| 9,109,498 B2 | 8/2015 | Bradley et al. | |
| 9,234,468 B2 | 1/2016 | Coldren | |
| 9,234,482 B2 | 1/2016 | Bromberg et al. | |
| 9,243,579 B2 | 1/2016 | Pruemm | |
| 9,249,740 B2 | 2/2016 | Matsuda et al. | |
| 9,267,485 B2 * | 2/2016 | Ravi | F02P 5/045 |
| 9,291,110 B2 | 3/2016 | Matsuda et al. | |
| 9,410,509 B2 * | 8/2016 | Roth | F02M 31/042 |
| 9,447,724 B2 | 9/2016 | Morris et al. | |
| 9,499,043 B2 | 11/2016 | Zocher et al. | |
| 9,512,808 B2 | 12/2016 | Cleary | |
| 9,518,543 B2 | 12/2016 | Kosuge et al. | |
| 9,546,617 B2 | 1/2017 | Fujimoto et al. | |
| 9,556,845 B2 | 1/2017 | Sasaki | |
| 9,587,553 B2 | 3/2017 | Fischer | |
| 9,593,284 B2 | 3/2017 | Morris | |
| 9,689,320 B2 | 6/2017 | Yagi et al. | |
| 9,726,122 B2 * | 8/2017 | Geckler | F02D 41/0065 |
| 9,752,514 B2 | 9/2017 | Amaral et al. | |
| 9,790,868 B2 | 10/2017 | Huang et al. | |
| 9,810,139 B2 | 11/2017 | Gruber et al. | |
| 9,850,808 B2 | 12/2017 | Kare et al. | |
| 9,863,305 B1 * | 1/2018 | Kolodziej | F02B 7/04 |
| 9,874,191 B2 | 1/2018 | Xiao et al. | |
| 9,903,262 B2 | 2/2018 | Edwards et al. | |
| 9,932,894 B2 | 4/2018 | Sturman | |
| 9,976,517 B2 | 5/2018 | Fiveland et al. | |
| 10,030,589 B1 | 7/2018 | Kim | |
| 10,054,085 B2 | 8/2018 | Foege | |
| 10,066,554 B2 | 9/2018 | Casamassima | |
| 10,082,109 B2 | 9/2018 | Engfehr et al. | |
| 10,100,719 B2 | 10/2018 | Moore | |
| 10,119,482 B1 | 11/2018 | Kim | |
| 10,174,703 B2 | 1/2019 | Zhou | |
| 10,197,019 B2 | 2/2019 | Shimada et al. | |
| 10,233,850 B2 * | 3/2019 | Roth | F02D 41/0007 |
| 10,253,688 B2 | 4/2019 | Arboleda | |
| 10,260,430 B2 * | 4/2019 | Moore | F02D 41/024 |
| 10,273,914 B2 | 4/2019 | Windbergs | |
| 10,301,991 B1 | 5/2019 | Dudar | |
| 10,316,733 B2 | 6/2019 | Takemoto et al. | |
| 10,358,971 B2 * | 7/2019 | Ochi | F02D 41/0057 |
| 10,364,771 B2 * | 7/2019 | Ochi | F02D 41/3047 |
| 10,378,427 B2 * | 8/2019 | Chang | F02B 11/00 |
| 10,378,462 B1 * | 8/2019 | Hamad | F02M 37/0082 |
| 10,408,139 B1 * | 9/2019 | Hamad | F02M 27/00 |
| 10,422,288 B1 * | 9/2019 | Hamad | F02D 33/003 |
| 10,436,126 B2 * | 10/2019 | Hamad | F02D 41/0032 |
| 10,458,307 B2 | 10/2019 | Doers et al. | |
| 10,494,992 B2 | 12/2019 | Johnson et al. | |
| 10,508,017 B2 * | 12/2019 | Al Khowaiter | B67D 7/78 |
| 10,544,749 B1 * | 1/2020 | Fedewa | F02D 41/402 |
| 10,605,209 B2 * | 3/2020 | Ruth | F02M 26/42 |
| 10,837,380 B2 * | 11/2020 | Youso | F02M 26/01 |
| 11,008,969 B2 * | 5/2021 | Youso | F02D 19/0649 |

(56) References Cited

U.S. PATENT DOCUMENTS

| | | | |
|---|---|---|---|
| 11,060,497 B2* | 7/2021 | Sellnau | F02B 29/0412 |
| 11,286,019 B2* | 3/2022 | Hedlund | B62M 27/02 |
| 11,415,068 B2* | 8/2022 | Ferrara | F02D 41/0027 |
| 11,428,186 B2* | 8/2022 | Blumreiter | F02D 41/0002 |
| 11,505,263 B2* | 11/2022 | Hedlund | B62M 27/02 |
| 11,542,856 B2 | 1/2023 | Edwards et al. | |
| 2005/0126551 A1 | 6/2005 | Mello et al. | |
| 2007/0125337 A1 | 6/2007 | Robinet | |
| 2008/0230041 A1 | 9/2008 | Brusslar et al. | |
| 2011/0000470 A1 | 1/2011 | Roth | |
| 2011/0023819 A1 | 2/2011 | Ives et al. | |
| 2011/0265770 A1 | 11/2011 | Malfa et al. | |
| 2012/0160217 A1 | 6/2012 | Ashizawa | |
| 2013/0213349 A1 | 8/2013 | Sellnau et al. | |
| 2014/0297159 A1* | 10/2014 | Surnilla | F02D 41/065 123/406.47 |
| 2015/0090217 A1* | 4/2015 | Kuzuyama | F02D 35/023 123/299 |
| 2015/0240758 A1 | 8/2015 | Fujimoto et al. | |
| 2016/0053700 A1 | 2/2016 | Thomas | |
| 2016/0108857 A1 | 4/2016 | Kanafani | |
| 2016/0237362 A1 | 8/2016 | Olah et al. | |
| 2017/0022924 A1 | 1/2017 | Fujimoto et al. | |
| 2018/0030907 A1 | 2/2018 | Bhosekar et al. | |
| 2018/0180013 A1 | 6/2018 | Sellnau et al. | |
| 2018/0209326 A1 | 7/2018 | Sturman | |
| 2018/0306098 A1 | 10/2018 | Edwards et al. | |
| 2019/0085776 A1 | 3/2019 | Tate, Jr. et al. | |
| 2019/0249597 A1 | 8/2019 | Asai | |
| 2019/0285027 A1 | 9/2019 | Pontet | |
| 2019/0309696 A1 | 10/2019 | Youso et al. | |
| 2019/0323457 A1 | 10/2019 | Rohrssen et al. | |
| 2019/0390627 A1 | 12/2019 | Youso et al. | |
| 2020/0256283 A1 | 8/2020 | Marko et al. | |
| 2022/0003184 A1 | 1/2022 | Blumreiter et al. | |
| 2022/0349359 A1 | 11/2022 | Blumreiter et al. | |

FOREIGN PATENT DOCUMENTS

| | | |
|---|---|---|
| EP | 1918555 A1 | 5/2008 |
| EP | 2080882 A1 | 7/2009 |
| EP | 2634389 A1 | 9/2013 |
| FR | 2960261 A1 | 11/2011 |
| JP | S59152031 A | 8/1984 |
| JP | S6480756 A | 3/1989 |
| WO | WO-9807973 A1 | 2/1998 |
| WO | WO-2007056845 A1 | 5/2007 |
| WO | WO-2013052912 A2 | 4/2013 |
| WO | WO-2014108969 A1 | 7/2014 |
| WO | WO-2016023752 A1 | 2/2016 |
| WO | WO-2016125380 A1 | 8/2016 |
| WO | WO-2019017060 A1 | 1/2019 |
| WO | WO-2020232287 A1 | 11/2020 |
| WO | WO-2021174016 A1 | 9/2021 |
| WO | WO-2022011275 A1 | 1/2022 |
| WO | WO-2022045909 A2 | 3/2022 |
| WO | WO-2023028156 A2 | 3/2023 |

OTHER PUBLICATIONS

Green, C.J. et al. (1990) "Dimethyl Ether as a Methanol Ignition Improver: Substitution Requirements and Exhaust Emissions Impact" International Fuels and Lubricants Meeting and Exposition, Tulsa, OK, Oct. 22-25, 1990. Society of Automotive Engineers (SAE) Technical Paper Series, Paper No. 902155; pp. 79-88.

International Preliminary Report on Patentability for International Application No. PCT/US2021/019930, dated Sep. 9, 2022, 14 pages.

International Search Report and Written Opinion for International Application No. PCT/US2022/041391, dated Feb. 23, 2023, 25 pages.

International Search Report and Written Opinion, dated Sep. 2, 2020, for International Application No. PCT/US2020/032961 (20 pages).

Invitation to Pay Additional Fees and, Where Applicable, Protest Fee, for International Application No. PCT/US2022/041391 dated Jan. 2, 2023, 17 Pages.

Johnson, B. and C. Edwards (Apr. 8, 2013) "Exploring the Pathway to High Efficiency IC Engines through Exergy Analysis of Heat Transfer Reduction" SAE Int. J. Engines, 6(1):150-166; doi:10.4271/2013-01-0278.

Kitamura, T. et al., "Mechanism of smokeless diesel combustion with oxygenated fuels based on the dependence of the equivalence ratio and temperature on soot particle formation," Int J Engine Research 2002, vol. 3, No. 4, pp. 223-248.

Miyamoto, N. et al. (1998) "Smokeless, Low NOx, High Thermal Efficiency, and Low Noise Diesel Combustion with Oxygenated Agents as Main Fuel" International Congress and Exposition, Detroit, MI, Feb. 23-26, 1998. Society of Automotive Engineers (SAE) Technical Paper Series, Paper No. 980506; 9 pages.

Ryan, T.W. et al. (1994) "Combustion and Emissions Characteristics of Minimally Processed Methanol in a Diesel Engine Without Ignition Assist" International Congress and Exposition, Detroit, MI, Feb. 28-Mar. 3, 1994. Society of Automotive Engineers (SAE) Technical Paper Series, Paper No. 940326; 10 pages.

Shen, M. et al. (Apr. 8, 2013) "Close to Stoichiometric Partially Premixed Combustion—The Benefit of Ethanol in Comparison to Conventional Fuels" Society of Automotive Engineers (SAE) Technical Paper Series, Paper No. 2013-01-0277, doi:10.4271/2013-01-0277; 16 pages.

Siebers, D.L. and C.F. Edwards (1987) "Auto Ignition of Methanol and Ethanol Sprays under Diesel Engine Conditions" International Congress and Exposition, Detroit, MI, Feb. 23-27, 1987. Society of Automotive Engineers (SAE) Technical Paper Series, Paper No. 870588; 16 pages.

Toepel, R.R. et al. (1983) "Development of Detroit Diesel Allison 6V-92TA Methanol Fueled Coach Engine", Fuels and Lubricants Meeting, San Francisco, CA, Oct. 31-Nov. 3, 1983. Society of Automotive Engineers (SAE) Technical Paper Series, Paper No. 831744; 20 pages.

* cited by examiner

FUEL AGNOSTIC COMPRESSION IGNITION ENGINE

CROSS-REFERENCE TO RELATED APPLICATIONS

This application is a continuation of U.S. patent application Ser. No. 17/863,481, filed Jul. 13, 2022 and entitled "Fuel Agnostic Compression Ignition Engine, which is a continuation of U.S. patent application Ser. No. 17/477,106, now U.S. Pat. No. 11,428,186, filed Sep. 16, 2021 and entitled "Fuel Agnostic Compression Ignition Engine," which is a continuation of International Patent Application No. PCT/US2021/019930, filed Feb. 26, 2021 and entitled "Fuel Agnostic Compression Ignition Engine," which claims priority and benefit of U.S. Provisional Application No. 62/981,808, filed Feb. 26, 2020 and entitled "Fuel Agnostic Compression Ignition Engine," the entire disclosure disclosures of which is are hereby incorporated by reference herein in its entirety their entireties.

BACKGROUND

A diesel engine is a rugged, reliable engine architecture having high torque/efficiency and simple ignition control enabled by the largely non-premixed nature of the combustion process. Standard diesel engine operation depends on the fuel being sufficiently ignitable in air, which requires pre-injection temperatures at least ~850K. These temperatures are most commonly achieved by compressing the air in a geometric volume ratio of about 17:1. During operation, this air compression is accomplished in the cylinder prior to fuel being sprayed in from a high-pressure direct injection from the fuel injector (i.e., the pressure in the fuel injector is greater than 800 bar at the point in time the fuel is injected). Diesel fuel itself meets this ignition criterion (i.e., igniting in air at 850K with a sufficiently short ignition delay), while numerous other fuels do not. This ignition criterion causes the exclusion of fuels with otherwise desirable attributes such as cost, regional availability, or other properties related to the way they burn. Currently, only fuels that can meet the diesel ignition criteria can be used in a diesel cycle (that is, non-premixed, mixing-controlled compression ignition). The ignition criteria is defined by a measurement of the fuel's ignition delay (a short ignition delay—short compared to the other time scales in the engine cycle such as piston motion and intake or exhaust event durations—is desired for a non-premixed combustion process), and is reported as a value called cetane number. A standard diesel engine has a narrow range of cetane numbers, for which the fuel can be combusted properly in the diesel engine.

SUMMARY

Embodiments described herein relate to engines that can operate in a diesel cycle on any fuel regardless of cetane number, and methods of operating the same. Some embodiments described herein relate to a method of operating a compression ignition (CI) engine. The CI engine includes an engine cylinder having an inner surface, a head surface, a piston disposed and configured to move in the engine cylinder, an intake valve, and an exhaust valve. The inner surface of the engine cylinder, the piston, the head surface, the intake valve, and the exhaust valve define a combustion chamber. The method of operating the compression ignition includes opening the intake valve to draw a volume of air into the combustion chamber, closing the intake valve, and moving the piston from a bottom-dead-center (BDC) position to a top-dead-center (TDC) position in the combustion chamber at a compression ratio of at least about 15:1. The method further includes injecting a volume of fuel into the combustion chamber at an engine crank angle between about 330 degrees and about 365 degrees during a first time period. The fuel has a cetane number less than about 40. The method further includes combusting substantially all of the volume of fuel. In some embodiments, a delay between injecting the volume of fuel into the combustion chamber and initiation of combustion is less than about 2 ms.

In some embodiments, the volume of fuel can be combusted in a mixing-controlled compression ignition (MCCI) regime. In some embodiments, the engine crank angle, at which the volume of fuel is injected, is greater than about 330 degrees by a sufficient margin such that no more than about 50% of the volume of the fuel is pre-mixed with the volume of air upon initiation of combustion. In some embodiments, at least about 30% of the energy generated from combustion of the fuel is generated while the volume of fuel is being injected into the combustion chamber. In some embodiments, the compression ratio can be between about 15:1 and about 25:1. In some embodiments, the fuel can be a first fuel, and the method can further include combusting a second fuel in the combustion chamber. In some embodiments, the second fuel can have a different cetane number, heating value, and/or chemical composition from the first fuel.

DETAILED DESCRIPTION

Chemical fuels (petroleum, alcohols, biodiesel, etc.) remain important to heavy-duty on-road transportation. Their high energy density is important for users who need to travel long distances and refuel quickly. As a result, the need for chemically fueled diesel engines will persist for decades. However, diesel fuel prices have increased substantially over the last three decades and diesel fuel is a significant contributor to greenhouse gas emissions. Additionally, emissions standards for nitrogen dioxide and nitric oxide (collectively referred to as NOX) as well as soot are becoming ever stricter.

Embodiments described herein relate to engines that can operate in a diesel cycle on any fuel regardless of cetane number, and methods of operating the same. In some embodiments, an engine can operate as a "fuel agnostic" engine by creating a high temperature environment inside the engine or in the immediate vicinity of the engine. In some embodiments, the high temperature environment can be created without having to change the traditional diesel engine architecture. In other words, the compression ratio of the diesel engine can remain the same, with only minimal changes to other components or aspects of the diesel engine. An increase in temperature can shorten the ignition delay of a fuel, allowing the fuel to behave in a similar manner to how a more ignitable fuel would behave at a lower temperature. For example, a first fuel with a cetane number of 55 can have a similar ignition delay at 700 K to the ignition delay of a second fuel with a cetane number of 15 at 1000 K. At sufficiently high temperatures, all fuels (even those most resistant to ignition) have sufficiently short ignition delay to sustain diesel style engine operation. Fuels have ignition delay curves that can depend on temperature, pressure, oxygen content of the air mixture in a cylinder the fuel is injected into, and/or any other factors.

Figure 1:
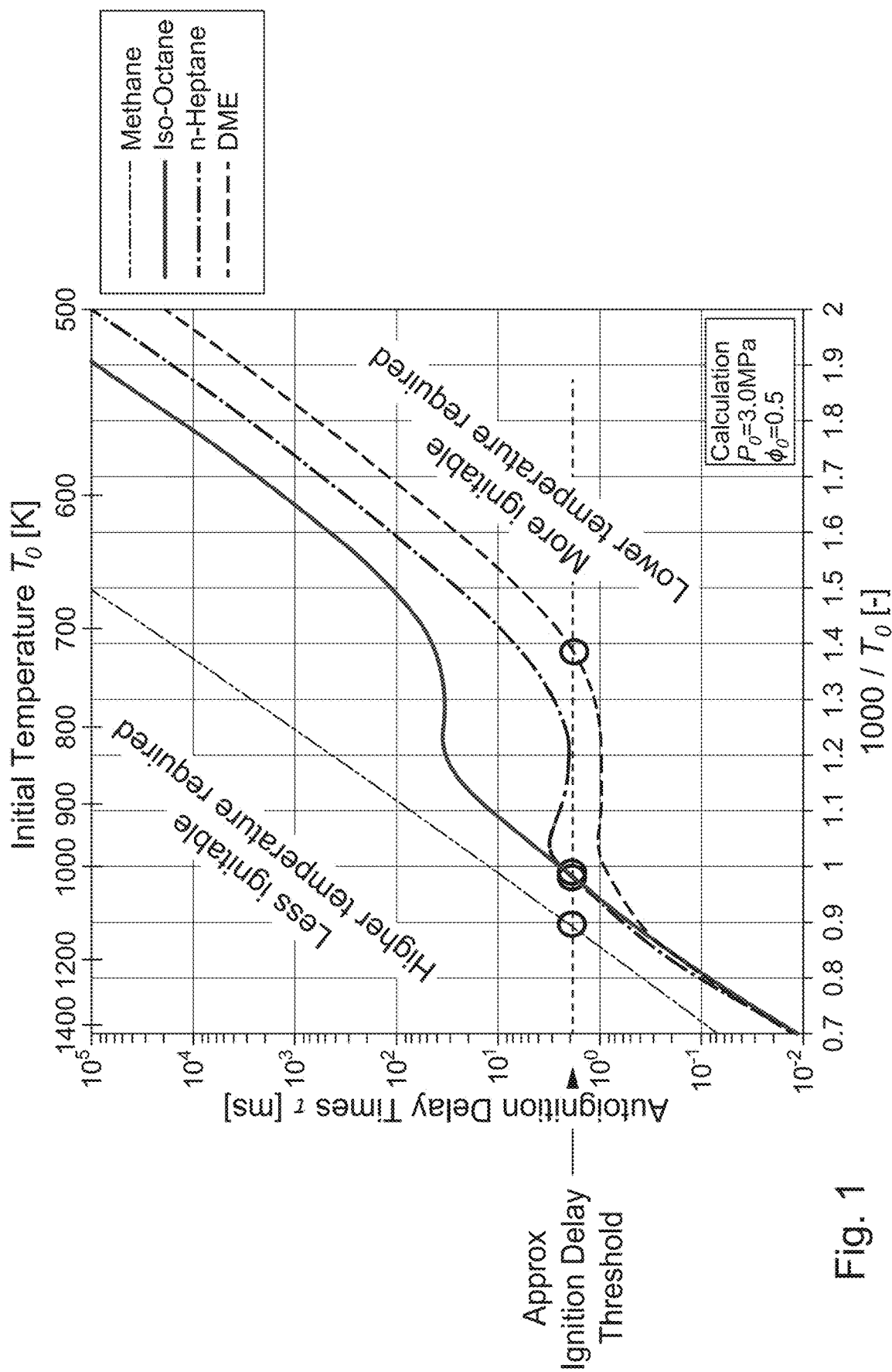
FIG. 1 is a chart of autoignition delay times of various fuels as a function of ignition temperature.

FIG. 1 shows a chart of autoignition delay times of various fuels as a function of ignition temperature. The x-axis shows initial temperature upon ignition, while the y-axis shows autoignition delay times as a function of initial temperature. Fuels shown on this chart include methane, iso-octane, n-heptane, and dimethyl ether (DME). Of the fuels shown, DME has the highest cetane number, about 55. Therefore, the other fuels shown (n-heptane, iso-octane, methane) require a higher temperature than DME to ignite after a given delay period (e.g., 2 ms). Ignition delay can be reduced or finely tuned by manipulating the temperature in the combustion chamber.

Benefits to creating a high temperature in the combustion chamber can include enablement of a fuel-flexible engine that can match the torque and power density of a diesel engine with the freedom to operate on any fuel, regardless of cetane number. In some embodiments, the fuel agnostic or fuel-flexible engine can be configured such that one or more on-board sensors detect fuel properties and control a temperature control mechanism employed in the engine. For example, the temperature control mechanism can add more heat to compensate when the sensor detects a low-cetane fuel. In some embodiments, the engine can be configured to adjust the amount of fuel injected, injection timing/scheduling, injection pressure, amount of exhaust gas retention (EGR), or any other suitable factors to achieve a desired engine load and combustion phasing, based on the fuel detected by the on-board sensor. This type of versatility can allow an owner or operator of the engine to choose a fuel that is most available, most affordable, or a fuel that meets any other desired criterion on any given occasion. The fuel-agnostic combustion process can de-couple the desirable attributes of the diesel cycle from fuel having ignition characteristics similar to those of diesel fuel. Fuels can instead be chosen based on other factors, such as cost, availability, carbon intensity, or emissions criteria.

Figure 2:
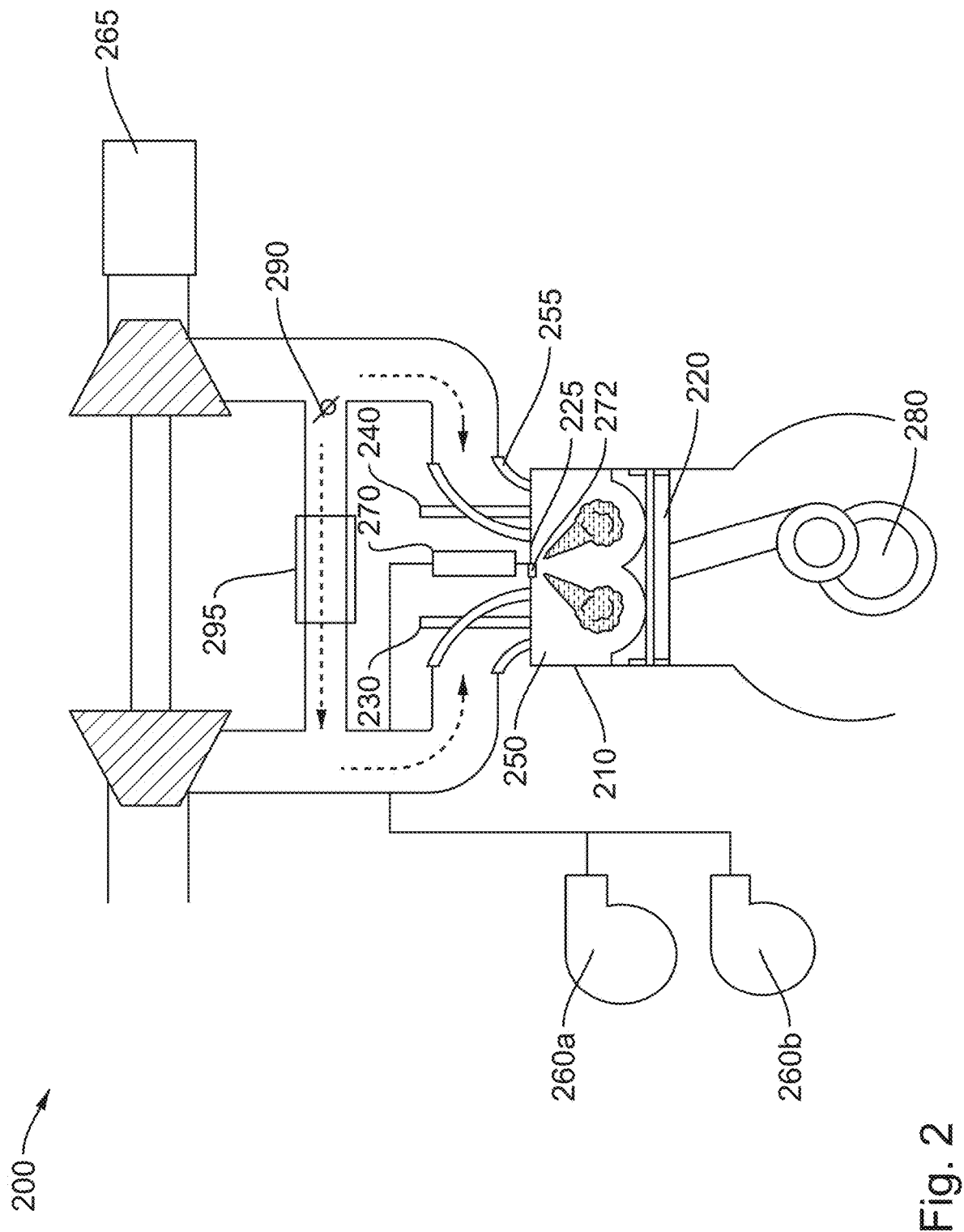
FIG. 2 is a schematic illustration of a compression ignition architecture, according to an embodiment.

FIG. 2 shows a compression ignition (CI) engine 200 that includes a cylinder 210, a piston 220 configured to move in the cylinder 210, a head deck 225, an intake valve 230, and an exhaust valve 240. The cylinder 210, piston 220, head deck 225, intake valve 230, and exhaust valve 240 collectively define the combustion chamber 250. As shown, the CI engine 200 further includes a first fuel supply 260a, a second fuel supply 260b (collectively referred to as fuel supplies 260), a three-way catalyst 265, a fuel injector 270, a sensor 272, a crankshaft 280, a recirculation port 290, and an EGR cooler 295. The intake valve 240 and the exhaust valve 250 can both be in contact with camshafts (not shown) that rotate to open and close the intake valve 240 and the exhaust valve 250 in accordance with the timing and distance necessary to achieve the desired air intake. In some embodiments, the intake valve 240 and the exhaust valve 250 can operate with a variable valve timing (VVT) scheme, as described in International Patent Publication WO 2020/232287 ("the '287 publication"), filed May 14, 2020 and entitled "Cold Start for High-Octane Fuels in a Diesel Engine Architecture," the disclosure of which is hereby incorporated by reference in its entirety. In some embodiments, one or more components of the CI engine 200 can include a thermal barrier coating 255, as described in U.S. Pat. No. 9,903,262 entitled, "Stoichiometric High-Temperature Direct-Injection Compression-Ignition Engine," filed Apr. 6, 2015 ("the '262 patent"), the disclosure of which is incorporated herein by reference in its entirety.

As shown, the first fuel supply 260a is fluidically coupled to the fuel injector 270. The fuel injector 270 injects fuel into the combustion chamber 250. As shown, the second fuel supply 260b is also fluidically coupled to the fuel injector 270. As shown, the first fuel supply 260a and the second fuel supply 260b are both fluidically coupled to the same fuel injector 270. In some embodiments, the first fuel supply 260a can be fluidically coupled to a first fuel injector and the second fuel supply 260b can be fluidically coupled to a second fuel injector. In some embodiments, the first fuel supply 260a can contain a first fuel and the second fuel supply 260b can contain a second fuel. In some embodiments, the second fuel can have a different cetane number, heating value, and/or chemical composition from the first fuel. As shown, the CI engine includes two fuel supplies 260a, 260b. In some embodiments, the CI engine can include 3, 4, 5, 6, 7, 8, 9, 10, 11, 12, 13, 14, 15, 16, 17, 18, 19, 20, or at least 20 fuel supplies 260, inclusive of all values and ranges therebetween.

The sensor 272 can detect or aid in detecting the type of fuel being injected into the combustion chamber 250. In some embodiments, the sensor 272 can detect relative permittivity of the fuel being injected into the combustion chamber 250 or use the capacitive principle. In some embodiments, the sensor 272 can detect pH. In some embodiments, the sensor 272 can include a heating element such that the sensor 272 can detect a boiling point or a vaporization point of the fuel entering the combustion chamber 250. In some embodiments, the sensor 272 can include a pressure transducer. In some embodiments, the sensor 272 can include a temperature transducer. In some embodiments, the sensor 272 can include tooling for infrared spectroscopy. In some embodiments, the sensor 272 can include a gel that changes color when it absorbs a certain type of fuel (e.g., carbon monoxide). In some embodiments, a light sensor can detect a change in color in the gel and can accordingly detect the type of fuel being injected. In some embodiments, if the sensor 272 is in the exhaust, then the detected oxygen content, temperature, and/or other quantities of the fuel can be used to infer fuel attributes and inform a control mechanism to adjust the temperature control mechanism and fueling accordingly.

In some embodiments, the sensor 272 can communicate with various components of the CI engine 200. In some embodiments, the sensor 272 can communicate with the recirculation port 290. For example, the sensor 272 can alert the recirculation port 290 to recirculate more exhaust to raise the temperature in the combustion chamber 250 when the sensor 272 detects a low cetane fuel. In some embodiments, the sensor 272 can communicate with the EGR cooler 295 to reduce cooling in order to raise the temperature in the combustion chamber 250. In some embodiments, the sensor 272 can communicate with a grid heater (not shown) to change the rate heat is added to a volume of air entering the combustion chamber 250. In some embodiments, the sensor 272 can communicate with a flame stabilizer (not shown) to change the rate heat is added to the volume of air entering the combustion chamber 250. In some embodiments, the sensor 272 can communicate with a catalytic burner (not shown) to change the rate heat is added to the volume of air entering the combustion chamber 250. In some embodiments, the sensor 272 can communicate with a turbocharger and/or supercharger (not shown) to change the amount of aftercooling on the turbocharger and/or supercharger. In some embodiments, the sensor 272 can substantially eliminate aftercooling on the turbocharger and/or supercharger. In some embodiments, the sensor 272 can communicate with the fuel injector 270 to modify the pressure at which fuel is injected from the fuel injector 270.

As shown, the sensor 272 is disposed in the combustion chamber 250. In some embodiments, the sensor 272 can be physically coupled to the fuel injector 270. In some embodiments, the sensor 272 can be physically coupled to the fuel injector 270 inside the combustion chamber 250. In some embodiments, the sensor 272 can be physically coupled to the fuel injector 270 outside the combustion chamber 250. In some embodiments, the sensor 272 can be coupled to the fuel line at a point between the fuel supplies 260 and the fuel injector 270. In some embodiments, the sensor 272 can be disposed in a bowl region of the combustion chamber 250. In some embodiments, the sensor 272 can be disposed in a squish region of the combustion chamber 250. In some embodiments, the CI engine can include multiple sensors disposed at different locations. In some embodiments the sensor 272 can be situated in the exhaust to detect temperature, oxygen concentration, or other quantities.

Based on fuel properties the sensor 272 detects, thermal management techniques can be implemented to facilitate combustion with minimal ignition delay. For example, a grid heater can apply heat or increase its rate of heat supply based on the detection of a low-cetane fuel by the sensor 272 in order to minimize ignition delay.

Figure 3:
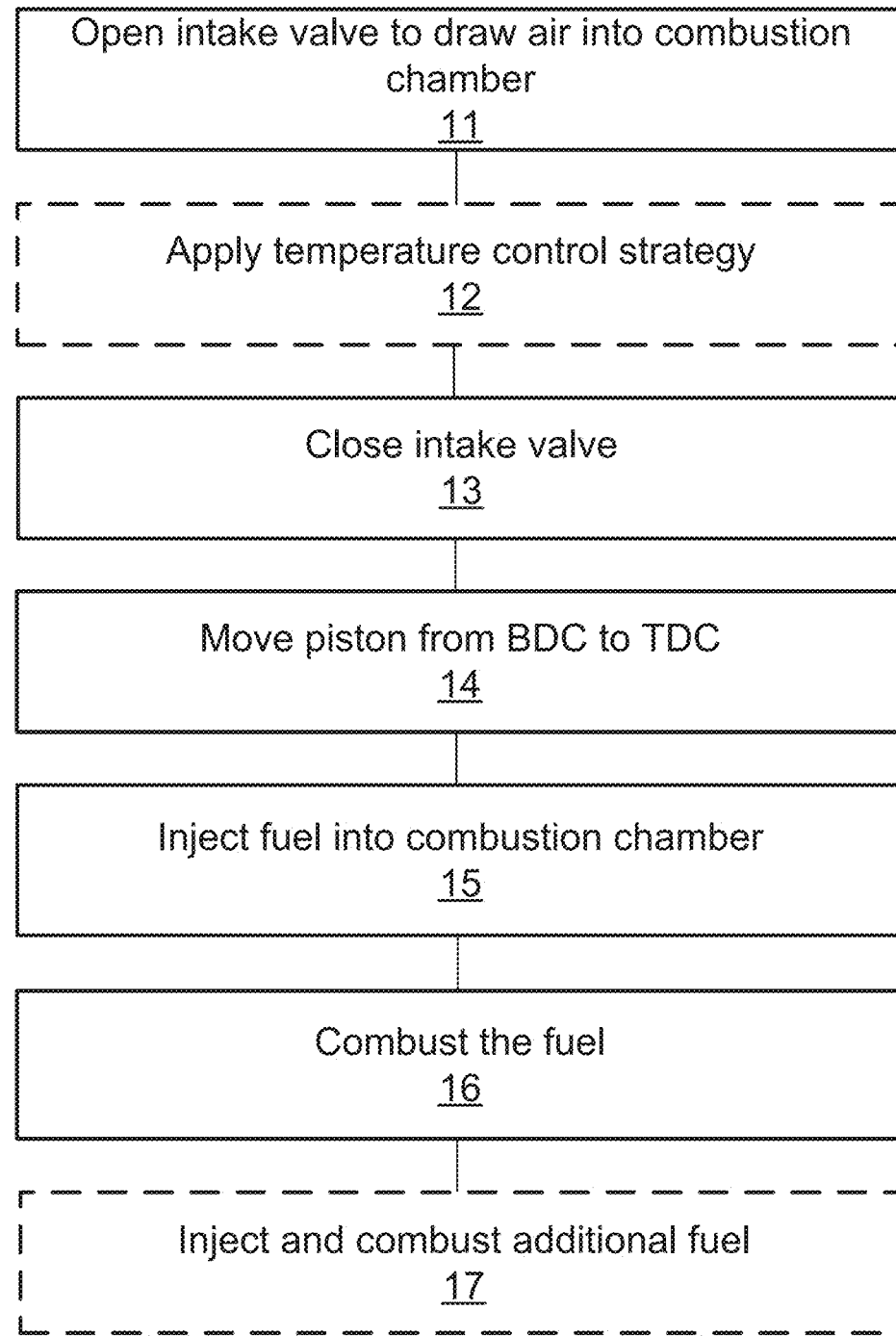
FIG. 3 is a block diagram of a method of operating a compression ignition engine, according to an embodiment.

FIG. 3 is a block diagram of a method 10 of operating a CI engine, according to an embodiment. As shown, the method 10 includes opening an intake valve to draw a volume of air into a combustion chamber at step 11. The method 10 optionally includes applying a temperature control strategy at step 12. The method 10 further includes closing the intake valve at step 13, moving the piston from BDC to TDC at step 14, injecting fuel into the combustion chamber at step 15, and combusting the fuel at step 16. The method 10 optionally includes injecting and combusting additional fuel (e.g., a second fuel) at step 17. In some embodiments, the CI engine, the intake valve, and the combustion chamber can be same or substantially similar to the CI engine 200, the intake valve 230, and the combustion chamber 250, as described above with reference to FIG. 2.

Step 11 includes opening the intake valve to draw a volume of air into the combustion chamber. In some embodiments, the intake valve can be opened at an engine crank angle of at least about 660°, at least about 665°, at least about 670°, at least about 675°, at least about 680°, at least about 685°, at least about 690°, at least about 695°, or at least about 700°. In some embodiments, the intake valve can be opened at an engine crank angle of no more than about 705°, no more than about 700°, no more than about 695°, no more than about 690°, no more than about 685°, no more than about 680°, no more than about 675°, no more than about 670°, or no more than about 665°. Combinations of the above-referenced engine crank angles for the opening of the intake valve are also possible (e.g., at least about 660° and no more than about 705° or at least about 665° and no more than about 700°), inclusive of all values and ranges therebetween. In some embodiments, the intake valve can be opened at an engine crank angle of about 660°, of about 665°, of about 670°, about 675°, about 680°, about 685°, about 690°, about 695°, about 700°, or about 705°.

In some embodiments, the volume of air drawn into the combustion chamber during step 11 can include atmospheric air, humid air, air enriched with oxygen, air diluted with exhaust gas, air diluted with inert gas, air mixed with an amount of uncombusted fuel, or any combination thereof. In some embodiments, the volume of air can be enriched with oxygen, such that the volume of air has an oxygen content of at least about 25%, at least about 30%, at least about 35%, at least about 40%, at least about 45%, at least about 50%, or at least about 55% by volume. In some embodiments, the volume of air can have an oxygen content of no more than about 60%, no more than about 55%, no more than about 50%, no more than about 45%, no more than about 40%, no more than about 35%, or no more than about 30% by volume. Combinations of the above-referenced values of oxygen content in the volume of air are also possible (e.g., at least about 25% and no more than about 60% by volume or at least about 30% and no more than about 50% by volume), inclusive of all values and ranges therebetween. In some embodiments, the volume of air can have an oxygen content of about 25%, about 30%, about 35%, about 40%, about 45%, about 50%, about 55%, or about 60% by volume.

In some embodiments, the volume of air drawn into the combustion chamber during step 11 can include fuel. In some embodiments, the volume of air drawn into the combustion chamber during step 11 can include at least about 1%, at least about 2%, at least about 3%, at least about 4%, at least about 5%, at least about 6%, at least about 7%, at least about 8%, at least about 9%, at least about 10%, at least about 11%, at least about 12%, at least about 13%, at least about 14%, at least about 15%, at least about 16%, at least about 17%, at least about 18%, or at least about 19% v:v fuel. In some embodiments, the volume of air drawn into the combustion chamber during step 11 can include no more than about 20%, no more than about 19%, no more than about 18%, no more than about 17%, no more than about 16%, no more than about 15%, no more than about 14%, no more than about 13%, no more than about 12%, no more than about 11%, no more than about 10%, no more than about 9%, no more than about 8%, no more than about 7%, no more than about 6%, no more than about 5%, no more than about 4%, no more than about 3%, or no more than about 2% v:v fuel. Combinations of the above-referenced volumetric percentages of fuel in the volume of air are also possible (e.g., at least about 1% and no more than about 20% or at least about 5% and no more than about 15%), inclusive of all values and ranges therebetween. In some embodiments, the volume of air drawn into the combustion chamber during step 11 can include about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, or about 20% v:v fuel.

At step 12, the method 10 optionally includes applying a temperature control strategy. In some embodiments, the temperature in the combustion chamber can be manipulated by heating the volume of air prior to drawing the volume of air into the combustion chamber. Since air is heated during the compression stroke of the engine cycle, inlet air temperatures can be increased to achieve a sufficiently high temperature in the combustion chamber prior to the injection of fuel into the combustion chamber. In other words, the volume of air can be heated to an intermediate value prior to or upon entering the combustion chamber, and then the compression in the combustion chamber can raise the temperature of the volume of air (and the fuel) to a suitable combustion chamber with minimal ignition delay. As an example, the volume of air can be heated to a temperature of about 130° C. to achieve a pre-fuel injection temperature inside the combustion chamber of about 1100° C. In some embodiments, the volume of air can be heated to a temperature of at least about 50° C., at least about 60° C., at least about 70° C., at least about 80° C., at least about 90° C., at least about 100° C., at least about 110° C., at least about 120° C., at least about 130° C., at least about 140° C., at least about 150° C., at least about 160° C., at least about 170° C., at least about 180° C., at least about 190° C., at least about 200° C., at least about 210° C., at least about 220° C., at least about 230° C., at least about 240° C., at least about 250° C., at least about 260° C., at least about 270° C., at least about 280° C., or at least about 290° C. prior to or upon entering the combustion chamber. In some embodiments, the volume of air can be heated to a temperature of no more than about 300° C., no more than about 290° C., no more than about 280° C., no more than about 270° C., no more than about 260° C., no more than about 250° C., no more than about 240° C., no more than about 230° C., no more than about 220° C., no more than about 210° C., no more than about 200° C., no more than about 190° C., no more than about 180° C., no more than about 170° C., no more than about 160° C., no more than about 150° C., no more than about 140° C., no more than about 130° C., no more than about 120° C., no more than about 110° C., no more than about 100° C., no more than about 90° C., no more than about 80° C., no more than about 70° C., or no more than about 60° C. prior to or upon entering the combustion chamber. Combinations of the above-referenced temperatures of the volume of air prior to or upon entering the combustion chamber are also possible (e.g., at least about 50° C. and no more than about 300° C. or at least about 100° C. and no more than about 200° C.), inclusive of all values and ranges therebetween. In some embodiments, the volume of air can be heated to a temperature of about 50° C., about 60° C., about 70° C., about 80° C., about 90° C., about 100° C., about 110° C., about 120° C., about 130° C., about 140° C., about 150° C., about 160° C., about 170° C., about 180° C., about 190° C., about 200° C., about 210° C., about 220° C., about 230° C., about 240° C., about 250° C., about 260° C., about 270° C., about 280° C., about 290° C., or about 300° C. prior to or upon entering the combustion chamber.

In some embodiments, step 12 can include eliminating aftercooling on a turbocharger and/or supercharger, using electric heating, or adding heat from the engine's exhaust. In some embodiments, adding heat from the CI engine's exhaust can be via heat exchange (i.e., through the walls of a heat exchange apparatus). In some embodiments, adding heat from the CI engine's exhaust can include introducing hot exhaust gas into the volume of air drawn into the combustion chamber (i.e., EGR). In some embodiments, the volume of air drawn into the combustion chamber upon opening the intake valve can include at least about 1%, at least about 2%, at least about 3%, at least about 4%, at least about 5%, at least about 10%, at least about 15%, at least about 20%, at least about 25%, at least about 30%, at least about 35%, at least about 40%, at least about 45%, at least about 50%, or at least about 55% by weight of recirculated exhaust gas. In some embodiments, the volume of air drawn into the combustion chamber upon opening the intake valve can include no more than about 60%, no more than about 55%, no more than about 50%, no more than about 45%, no more than about 40%, no more than about 35%, no more than about 30%, no more than about 25%, no more than about 20%, no more than about 15%, no more than about 10%, no more than about 5%, no more than about 4%, no more than about 3%, or no more than about 2% by weight of recirculated exhaust gas. Combinations of the above-referenced weight percentages of exhaust gas in the volume of air drawn into the combustion chamber upon opening the intake valve are also possible (e.g., at least about 1% and no more than about 50% or at least about 10% and no more than about 30%), inclusive of all values and ranges therebetween. In some embodiments, the volume of air drawn into the combustion chamber upon opening the intake valve can include about 1%, about 2%, about 3%, about 4%, about 5%, about 10%, about 15%, about 20%, about 25%, about 30%, about 35%, about 40%, about 45%, about 50%, about 55%, or about 60% by weight of recirculated exhaust gas. In some embodiments, a burner with flame stabilization and/or a catalytic burner can be used to create hot combustion products in the intake channel of the CI engine to elevate the temperature of the air drawn into the combustion chamber. In some embodiments, a grid heater can be used to apply heat to the volume of air prior to being drawn into the combustion chamber.

In addition to introducing higher temperature air or intake mixture into the CI engine, an insulating effect within the CI engine can retain thermal energy that can achieve the sufficiently high pre-injection temperature to achieve combustion of any fuel in a diesel style architecture. In some embodiments, thermal insulation can include surface treatments, use of low thermal conductivity materials, elevated coolant temperatures, and/or any other method of reduced cooling. In some embodiments, the insulation can be located on the piston, within the intake valve, within the exhaust valve, and/or any other suitable locations in the CI engine. Further examples of thermal insulation are described in the '262 patent.

In some embodiments, any combination of the above-referenced thermal management methods can be used together in parallel and/or in series. In other words, a first thermal management method can be used for a first time period, and a second thermal management method can be used for a second time period. In some embodiments, the second thermal management method can be different from the first thermal management method. In some embodiments, the first time period can at least partially overlap with the second time period. In some embodiments, the first time period can fully overlap with the second time period. In some embodiments, the first time period can be separate from the second time period. In some embodiments, the first thermal management method can have a shorter response time than the second thermal management method. For example, in a transient situation, a heater (e.g., a grid heater or glow plug) can be used during the first time period and EGR can be used during the second time period. A heater has a shorter response time, and can be effective more quickly (i.e., in less than one second), while EGR can be slower to respond and be effective.

In some embodiments, the first time period and/or the second time period can be about 20 ms, about 40 ms, about 60 ms, about 80 ms, 0.1 seconds, about 0.2 seconds, about 0.3 seconds, about 0.4 seconds, about 0.5 seconds, about 0.6 seconds, about 0.7 seconds, about 0.8 seconds, about 0.9 seconds, about 1 second, about 1.1 seconds, about 1.2 seconds, about 1.3 seconds, about 1.4 seconds, about 1.5 seconds, about 1.6 seconds, about 1.7 seconds, about 1.8 seconds, about 1.9 seconds or about 2 seconds, inclusive of all values and ranges therebetween.

The method 10 further includes closing the intake valve at step 13. In some embodiments, the intake valve can be closed at an engine crank angle of at least about 160°, at least about 165°, at least about 170°, at least about 175°, at least about 180°, at least about 185°, at least about 190°, at least about 195°, at least about 200°, at least about 205°, at least about 210°, at least about 215°, at least about 220°, at least about 225°, at least about 230°, at least about 235°, at least about 240°, at least about 245°, at least about 250°, or at least about 255°. In some embodiments, the intake valve can be closed at an engine crank angle of no more than about 260°, no more than about 255°, no more than about 250°, no more than about 245°, no more than about 240°, no more than about 235°, no more than about 230°, no more than about 225°, no more than about 220°, no more than about 215°, no more than about 210°, no more than about 205°, no more than about 200°, no more than about 195° no more than about 190°, no more than about 185°, no more than about 180°, no more than about 175°, no more than about 170°, or no more than about 165°. Combinations of the above-referenced engine crank angles for the closing of the intake valve are also possible (e.g., at least about 160° and no more than about 260° or at least about 180° and no more than about 200°), inclusive of all values and ranges therebetween. In some embodiments, intake valve can be closed at an engine crank angle of about 160°, about 165°, about 170°, about 175°, about 180°, about 185°, about 190°, about 195°, about 200°, about 205°, about 210°, about 215°, about 220°, about 225°, about 230°, about 235°, about 240°, about 245°, about 250°, about 255°, or about 260°.

In some embodiments, thermal energy can be added to the CI engine during the compression stroke from sources other than the compression process. In some embodiments, the combustion chamber can include heating devices such as a glow plug, a hot air jet, plasma, and/or any other device for introduction of additional thermal energy to the volume of air and/or the volume of fuel in the combustion chamber prior to ignition. In some embodiments, the temperature of the volume of air and/or the volume of fuel in the combustion chamber prior to ignition can be tuned to the ignition characteristics of each fuel being used in the engine. In some embodiments, the rise in temperature of the volume of air and/or the volume of fuel in the combustion chamber can be held constant at a value high enough that any fuel to be used in the engine would ignite with minimal ignition delay (e.g., an ignition delay of less than 2 ms).

The method 10 includes moving the piston from BDC to TDC at step 14. In some embodiments, the CI engine can have a compression ratio of at least about 10:1, at least about 11:1, at least about 12:1, at least about 13:1, at least about 14:1, at least about 15:1, at least about 16:1, at least about 17:1, at least about 18:1, at least about 19:1, at least about 20:1, at least about 21:1, at least about 22:1, at least about 23:1, at least about 24:1, at least about 25:1, at least about 26:1, at least about 27:1, at least about 28:1, or at least about 29:1. In some embodiments, the CI engine can have a compression ratio of no more than about 30:1, no more than about 29:1, no more than about 28:1, no more than about 27:1, no more than about 26:1, no more than about 25:1, no more than about 24:1, no more than about 23:1, no more than about 22:1, no more than about 21:1, no more than about 20:1, no more than about 19:1, no more than about 18:1, no more than about 17:1, no more than about 16:1, no more than about 15:1, no more than about 14:1, no more than about 13:1, no more than about 12:1, or no more than about 11:1. Combinations of the above-referenced compression ratios are also possible (e.g., at least about 10:1 and no more than about 30:1 or at least about 13:1 and no more than about 20:1), inclusive of all values and ranges therebetween. In some embodiments, the CI engine can have a compression ratio of about 10:1, about 11:1, about 12:1, about 13:1, about 14:1, about 15:1, about 16:1, about 17:1, about 18:1, about 19:1, about 20:1, about 21:1, about 22:1, about 23:1, about 24:1, about 25:1, about 26:1, about 27:1, about 28:1, about 29:1, or about 30:1.

In some embodiments, moving the piston from BDC to TDC can occur at least partially concurrently with the opening of the intake valve. In some embodiments, moving the piston from BDC to TDC can occur substantially concurrently with the opening of the intake valve. In some embodiments, moving the piston from BDC to TDC can occur with little or no overlap to the opening of the intake valve. In some embodiments, moving the piston from BDC to TDC can occur at least partially concurrently with the closing of the intake valve. In some embodiments, moving the piston from BDC to TDC can occur substantially concurrently with the closing of the intake valve. In some embodiments, moving the piston from BDC to TDC can occur with little or no overlap to the closing of the intake valve.

The method 10 includes injecting a volume of fuel into the combustion chamber at step 15. In some embodiments, the volume of fuel and the volume of air can be introduced into the combustion chamber in a stoichiometric ratio. In some embodiments, the volume of fuel and the volume of air can be introduced into the combustion chamber in a non-stoichiometric ratio.

In some embodiments, the fuel can have a cetane number of at least about −10, at least about −5, at least about 0, at least about 5, at least about 10, at least about 15, at least about 20, at least about 25, at least about 30, or at least about 35. In some embodiments, the fuel can have a cetane number of no more than about 40, no more than about 35, no more than about 30, no more than about 25, no more than about 20, no more than about 15, no more than about 10, no more than about 5, no more than about 0, or no more than about −5. Combinations of the above-referenced cetane numbers of the fuel are also possible (e.g., at least about −10 and no more than about 40 or at least about 10 and no more than about 20), inclusive of all values and ranges therebetween. In some embodiments, the fuel can have a cetane number of about −10, about −5, about 0, about 5, about 10, about 15, about 20, about 25, about 30, about 35, or about 40. In some embodiments, the fuel can include naphtha, gasoline, alcohol, butanol, propanol, ethanol, methanol, gaseous hydrocarbons, natural gas, methane, ethane, propane, butane, hexane, alternative fuels, hydrogen, ammonia, syngas, and/or CO. In some embodiments, the fuel can have a low amount of additives that result in a substantial change in cetane number. In some embodiments, the fuel can include less than about 5,000 ppm, less than about 4,000 ppm, less than about 3,000 ppm, less than about 2,000 ppm, less than about 1,000 ppm, less than about 900 ppm, less than about 800 ppm, less than about 700 ppm, less than about 600 ppm, or less than about 500 ppm by weight of additives that result in a substantial change in cetane number. In some embodiments, the fuel can be substantially free of additives that result in a substantial change in cetane number.

In some embodiments, the fuel can have an octane number (i.e., calculated via (RON+MON)/2 method) of at least about 50, at least about 55, at least about 60, at least about 65, at least about 70, at least about 75, at least about 80, at least about 85, at least about 90, at least about 95, at least about 100, at least about 105, at least about 110, at least about 115, at least about 120, at least about 125, at least about 130, at least about 135, at least about 140, or at least about 145. In some embodiments, the fuel can have an octane number of no more than about 150, no more than about 145, no more than about 140, no more than about 135, no more than about 130, no more than about 125, no more than about 120, no more than about 115, no more than about 110, no more than about 105, no more than about 100, no more than about 95, no more than about 90, no more than about 85, no more than about 80, no more than about 75, no more than about 70, no more than about 65, no more than about 60, or no more than about 55. Combinations of the above-referenced octane numbers are also possible (e.g., at least about 50 and no more than about 150 or at least about 80 and no more than about 120, inclusive of all values and ranges therebetween. In some embodiments, the fuel can have an octane number of about 50, about 55, about 60, about 65, about 70, about 75, about 80, about 85, about 90, about 95, about 100, about 105, about 110, about 115, about 120, about 125, about 130, about 135, about 140, about 145, or about 150.

In some embodiments, the volume of fuel can be injected from a fuel injector (e.g., the fuel injector 270, as described above with reference to FIG. 2) at an injection pressure of at least about 800 bar (absolute), at least about 900 bar, at least about 1,000 bar, at least about 1,100 bar, at least about 1,200 bar, at least about 1,300 bar, at least about 1,400 bar, at least about 1,500 bar, at least about 1,600 bar, at least about 1,700 bar, at least about 1,800 bar, at least about 1,900 bar, at least about 2,000 bar, at least about 2,100 bar, at least about 2,200 bar, at least about 2,300 bar, at least about 2,400 bar, at least about 2,500 bar, at least about 2,600 bar, at least about 2,700 bar, at least about 2,800 bar, or at least about 2,900 bar. In some embodiments, the volume of fuel can be injected from the fuel injector at an injection pressure of no more than about 3,000 bar, no more than about 2,900 bar, no more than about 2,800 bar, no more than about 2,700 bar, no more than about 2,600 bar, no more than about 2,500 bar, no more than about 2,400 bar, no more than about 2,300 bar, no more than about 2,200 bar, no more than about 2,100 bar, no more than about 2,000 bar, no more than about 1,900 bar, no more than about 1,800 bar, no more than about 1,700 bar, no more than about 1,600 bar, no more than about 1,500 bar, no more than about 1,400 bar, no more than about 1,300 bar, no more than about 1,200 bar, no more than about 1,100 bar, no more than about 1,000 bar, no more than about 900 bar. Combinations of the above-referenced injection pressures are also possible (e.g., at least about 800 bar and no more than about 3,000 bar or at least about 1,200 bar and no more than about 2,000 bar), inclusive of all values and ranges therebetween. In some embodiments, the fuel can be injected from the fuel injector at an injection pressure of about 800 bar, about 900 bar, about 1,000 bar, about 1,100 bar, about 1,200 bar, about 1,300 bar, about 1,400 bar, about 1,500 bar, about 1,600 bar, about 1,700 bar, about 1,800 bar, about 1,900 bar, about 2,000 bar, about 2,100 bar, about 2,200 bar, about 2,300 bar, about 2,400 bar, about 2,500 bar, about 2,600 bar, about 2,700 bar, about 2,800 bar, about 2,900 bar, or about 3,000 bar.

In some embodiments, the volume of fuel can be injected at an engine crank angle of at least about 310 degrees, at least about 315 degrees, at least about 320 degrees, at least about 325 degrees, at least about 330 degrees, at least about 335 degrees, at least about 340 degrees, at least about 345 degrees, at least about 350 degrees, at least about 355 degrees, at least about 360 degrees, at least about 365 degrees, or at least about 370 degrees. In some embodiments, the volume of fuel can be injected at an engine crank angle of no more than about 375 degrees, no more than about 370 degrees, no more than about 365 degrees, no more than about 360 degrees, no more than about 355 degrees, no more than about 350 degrees, no more than about 345 degrees, no more than about 340 degrees, no more than about 335 degrees, no more than about 330 degrees, no more than about 325 degrees, no more than about 320 degrees, or no more than about 315 degrees. Combinations of the above-referenced engine crank angles at injection of the volume of fuel are also possible (e.g., at least about 310 degrees and no more than about 375 degrees or at least about 330 degrees and no more than about 365 degrees), inclusive of all values and ranges therebetween. In some embodiments, the volume of fuel can be injected at an engine crank angle of about 310 degrees, about 315 degrees, about 320 degrees, about 325 degrees, about 330 degrees, about 335 degrees, about 340 degrees, about 345 degrees, about 350 degrees, about 355 degrees, about 360 degrees, about 365 degrees, about 370 degrees, or about 375 degrees.

In some embodiments, injection of the volume of fuel can occur at least partially concurrently with moving the piston from BDC to TDC. In some embodiments, injection of the volume of fuel can occur substantially concurrently with moving the piston from BDC to TDC. In some embodiments, injection of the volume of fuel can occur with little or no overlap to moving the piston from BDC to TDC.

In some embodiments, injection of the volume of fuel can be modified to control the rate of pressure rise in the combustion chamber from combustion of the volume of fuel. Pressure rise rate is often treated as a constraint in engines in attempting to minimize engine noise and vibration. Some alternative combustion strategies (e.g., homogeneous charge compression ignition engines) can struggle to minimize pressure rise rate, particularly at high loads. Embodiments described herein relate to methods of controlling pressure rise rate by controlling the rate of combustion (i.e., by controlling mixing and injection in a mixing-limited system). In other words, pressure rise rate can be as low as desired to reduce noise and vibration, and controlled in the same manner as a conventional diesel engine.

In some embodiments, the rate of pressure rise can be less than about 15 bar per crank angle degree, less than about 14 bar per crank angle degree, less than about 13 bar per crank angle degree, less than about 12 bar per crank angle degree, less than about 11 bar per crank angle degree, less than about 10 bar per crank angle degree, less than about 9 bar per crank angle degree, less than about 8 bar per crank angle degree, less than about 7 bar per crank angle degree, less than about 6 bar per crank angle degree, less than about 5 bar per crank angle degree, less than about 4 bar per crank angle degree, less than about 3 bar per crank angle degree, less than about 2 bar per crank angle degree, or less than about 1 bar per crank angle degree, inclusive of all values and ranges therebetween. In some embodiments, controlling the rate of pressure rise can be done independently from changing the injection timing of the volume of fuel. In some embodiments, controlling the rate of pressure rise from the combustion chamber can be exclusively via changing the injection timing of the volume of fuel. In some embodiments, injection timing can be changed by an engine control unit using either electrical or hydraulic means to trigger fuel injector opening at a desired time to shift timing either earlier or later. In some embodiments, injection timing can be changed mechanically based on a mechanical linkage to a cam or other device in response to changing operating conditions such as engine speed.

The method 10 includes combusting the volume of fuel at step 16. In some embodiments, step 16 can include combusting substantially all of the volume of fuel. In some embodiments, the volume-average temperature in the combustion chamber immediately prior to ignition can be at least about 500 K, at least about 550 K, at least about 600 K, at least about 650 K, at least about 700 K, at least about 750 K, at least about 800 K, at least about 850 K, at least about 900 K, at least about 950 K, at least about 1,000 K, at least about 1,050 K, at least about 1,100 K, at least about 1,150 K, at least about 1,200 K, at least about 1,250 K, at least about 1,300 K, at least about 1,350 K, at least about 1,400 K, or at least about 1,500 K. In some embodiments, the volume-average temperature in the combustion chamber immediately prior to ignition can be no more than about 1,500 K, no more than about 1,450 K, no more than about 1,400 K, no more than about 1,350 K, no more than about 1,300 K, no more than about 1,250 K, no more than about 1,200 K, no more than about 1,150 K, no more than about 1,100 K, no more than about 1,050 K, no more than about 1,000 K, no more than about 950 K, no more than about 900 K, no more than about 850 K, no more than about 800 K, no more than about 750 K, no more than about 700 K, no more than about 650 K, no more than about 600 K, or no more than about 550 K. Combinations of the above-referenced volume-average temperatures in the combustion chamber immediately prior to ignition are also possible (e.g., at least about 500 K and no more than about 1,500 K or at least about 700 K and no more than about 1,100 K), inclusive of all values and ranges therebetween. In some embodiments, the volume-average temperature in the combustion chamber immediately prior to ignition can be about 500 K, about 550 K, about 600 K, about 650 K, about 700 K, about 750 K, about 800 K, about 850 K, about 900 K, about 950 K, about 1,000 K, about 1,050 K, about 1,100 K, about 1,150 K, about 1,200 K, about 1,250 K, about 1,300 K, about 1,350 K, about 1,400 K, or about 1,500 K In some embodiments, the volume-average temperature in the combustion chamber immediately prior to ignition can be a function of the cetane number of the fuel. In some embodiments, if the fuel has a cetane number between about 30 and about 40, the volume-average temperature in the combustion chamber immediately prior to ignition can be at least about 700 K, at least about 750 K, at least about 800 K, at least about 850 K, at least about 900 K, at least about 950 K, at least about 1,000 K, at least about 1,050 K, at least about 1,100 K, at least about 1,150 K, at least about 1,200 K, or at least about 1,250 K. In some embodiments, if the fuel has a cetane number between about 30 and about 40, the volume-average temperature in the combustion chamber immediately prior to ignition can be no more than about 1,300 K, no more than about 1,250 K, no more than about 1,200 K, no more than about 1,150 K, no more than about 1,100 K, no more than about 1,050 K, no more than about 1,000 K, no more than about 950 K, no more than about 900 K, no more than about 850 K, no more than about 800 K, or no more than about 750 K. Combinations of the above-referenced volume-average temperatures in the combustion chamber immediately prior to ignition are also possible (e.g., at least about 700 K and no more than about 1,300 K or at least about 800 K and no more than about 1,000 K), inclusive of all values and ranges therebetween. In some embodiments, if the fuel has a cetane number between about 30 and about 40, the volume-average temperature in the combustion chamber immediately prior to ignition can be about 700 K, about 750 K, about 800 K, about 850 K, about 900 K, about 950 K, about 1,000 K, about 1,050 K, about 1,100 K, about 1,150 K, about 1,200 K, about 1,250 K, or about 1,300 K.

In some embodiments, if the fuel has a cetane number between about 20 and about 30, the volume-average temperature in the combustion chamber immediately prior to ignition can be at least about 800 K, at least about 850 K, at least about 900 K, at least about 950 K, at least about 1,000 K, at least about 1,050 K, at least about 1,100 K, at least about 1,150 K, at least about 1,200 K, at least about 1,250 K, at least about 1,300 K, or at least about 1,350 K. In some embodiments, if the fuel has a cetane number between about 20 and about 30, the volume-average temperature in the combustion chamber immediately prior to ignition can be no more than about 1,400 K, no more than about 1,350 K, no more than about 1,300 K, no more than about 1,250 K, no more than about 1,200 K, no more than about 1,150 K, no more than about 1,100 K, no more than about 1,050 K, no more than about 1,000 K, no more than about 950 K, no more than about 900 K, or no more than about 850 K. Combinations of the above-referenced volume-average temperatures in the combustion chamber immediately prior to ignition are also possible (e.g., at least about 800 K and no more than about 1,400 K or at least about 900 K and no more than about 1,100 K), inclusive of all values and ranges therebetween. In some embodiments, if the fuel has a cetane number between about 20 and about 30, the volume-average temperature in the combustion chamber immediately prior to ignition can be about 800 K, about 850 K, about 900 K, about 950 K, about 1,000 K, about 1,050 K, about 1,100 K, about 1,150 K, about 1,200 K, about 1,250 K, about 1,300 K, about 1,350 K, or about 1,400 K.

In some embodiments, if the fuel has a cetane number between about 10 and about 20, the volume-average temperature in the combustion chamber immediately prior to ignition can be at least about 850 K, at least about 900 K, at least about 950 K, at least about 1,000 K, at least about 1,050 K, at least about 1,100 K, at least about 1,150 K, at least about 1,200 K, at least about 1,250 K, at least about 1,300 K, at least about 1,350 K, or at least about 1,400 K. In some embodiments, if the fuel has a cetane number between about 10 and about 20, the volume-average temperature in the combustion chamber immediately prior to ignition can be no more than about 1,450 K, no more than about 1,400 K, no more than about 1,350 K, no more than about 1,300 K, no more than about 1,250 K, no more than about 1,200 K, no more than about 1,150 K, no more than about 1,100 K, no more than about 1,050 K, no more than about 1,000 K, no more than about 950 K, or no more than about 900 K. Combinations of the above-referenced volume-average temperatures in the combustion chamber immediately prior to ignition are also possible (e.g., at least about 850 K and no more than about 1,450 K or at least about 950 K and no more than about 1,150 K), inclusive of all values and ranges therebetween. In some embodiments, if the fuel has a cetane number between about 10 and about 20, the volume-average temperature in the combustion chamber immediately prior to ignition can be about 850 K, about 900 K, about 950 K, about 1,000 K, about 1,050 K, about 1,100 K, about 1,150 K, about 1,200 K, about 1,250 K, about 1,300 K, about 1,350 K, about 1,400 K, or about 1,450 K.

In some embodiments, if the fuel has a cetane number between about 0 and about 10, the volume-average temperature in the combustion chamber immediately prior to ignition can be at least about 950 K, at least about 1,000 K, at least about 1,050 K, at least about 1,100 K, at least about 1,150 K, at least about 1,200 K, at least about 1,250 K, at least about 1,300 K, at least about 1,350 K, at least about 1,400 K, at least about 1,450 K, or at least about 1,500 K. In some embodiments, if the fuel has a cetane number between about 0 and about 10, the volume-average temperature in the combustion chamber immediately prior to ignition can be no more than about 1,550 K, no more than about 1,500 K, no more than about 1,450 K, no more than about 1,400 K, no more than about 1,350 K, no more than about 1,300 K, no more than about 1,250 K, no more than about 1,200 K, no more than about 1,150 K, no more than about 1,100 K, no more than about 1,050 K, or no more than about 1,000 K. Combinations of the above-referenced volume-average temperatures in the combustion chamber immediately prior to ignition are also possible (e.g., at least about 950 K and no more than about 1,550 K or at least about 1,050 K and no more than about 1,250 K), inclusive of all values and ranges therebetween. In some embodiments, if the fuel has a cetane number between about 0 and about 10, the volume-average temperature in the combustion chamber immediately prior to ignition can be about 950 K, about 1,000 K, about 1,050 K, about 1,100 K, about 1,150 K, about 1,200 K, about 1,250 K, about 1,300 K, about 1,350 K, about 1,400 K, about 1,450 K, about 1,500 K, or about 1,550 K.

In some embodiments, if the fuel has a cetane number less than about 0, the volume-average temperature in the combustion chamber immediately prior to ignition can be at least about 1,050 K, at least about 1,100 K, at least about 1,150 K, at least about 1,200 K, at least about 1,250 K, at least about 1,300 K, at least about 1,350 K, at least about 1,400 K, at least about 1,450 K, at least about 1,500 K, at least about 1,550 K, or at least about 1,600 K. In some embodiments, if the fuel has a cetane number less than about 0, the volume-average temperature in the combustion chamber immediately prior to ignition can be no more than about 1,650 K, no more than about 1,600 K, no more than about 1,550 K, no more than about 1,400 K, no more than about 1,450 K, no more than about 1,400 K, no more than about 1,350 K, no more than about 1,300 K, no more than about 1,250 K, no more than about 1,200 K, no more than about 1,150 K, or no more than about 1,100 K. Combinations of the above-referenced volume-average temperatures in the combustion chamber immediately prior to ignition are also possible (e.g., at least about 1,050 K and no more than about 1,650 K or at least about 1,150 K and no more than about 1,350 K), inclusive of all values and ranges therebetween. In some embodiments, if the fuel has a cetane number of less than about 0, the volume-average temperature in the combustion chamber immediately prior to ignition can be about 1,050 K, about 1,100 K, about 1,150 K, about 1,200 K, about 1,250 K, about 1,300 K, about 1,350 K, about 1,400 K, about 1,450 K, about 1,500 K, about 1,550 K, about 1,600 K, or about 1,650 K.

In some embodiments, less than 50% of the volume of fuel can be pre-mixed with the volume of air upon initiation of combustion. In other words, the ignition of the volume of fuel can be mixing controlled, or MCCI. In some embodiments, at least about 5%, at least about 10%, at least about 15%, at least about 20%, at least about 25%, at least about 30%, at least about 35%, at least about 40%, or at least about 45% of the volume of fuel can be pre-mixed with the volume of air upon initiation of combustion. In some embodiments, no more than about 50%, no more than about 45%, no more than about 40%, no more than about 35%, no more than about 30%, no more than about 25%, no more than about 20%, no more than about 15%, or no more than about 10% of the volume of fuel can be pre-mixed with the volume of air upon initiation of combustion. Combinations of the above-referenced percentages of the volume of fuel pre-mixed with the volume of air are also possible (e.g., at least about 5% and no more than about 50% or at least about 10% and no more than about 40%), inclusive of all values and ranges therebetween. In some embodiments, about 5%, about 10%, about 15%, about 20%, about 25%, about 30%, about 35%, about 40%, about 45%, or about 50% of the volume of fuel can be pre-mixed with the volume of air upon initiation of combustion. In some embodiments, the local equivalence ratio at points within the combustion chamber can be at least about 1.5, at least about 2, at least about 3, at least about 4, at least about 5, at least about 6, at least about 7, at least about 8, at least about 9, or at least about 10, inclusive of all values and ranges therebetween.

In some embodiments, at least about 25% of the energy generated from combustion of the volume of fuel can be generated while the volume of fuel is being injected into the combustion chamber. In some embodiments, at least about 30% of the energy generated from combustion of the volume of fuel can be generated while the volume of fuel is being injected into the combustion chamber. In some embodiments, at least about 35%, at least about 40%, at least about 45%, at least about 50%, at least about 55%, at least about 60%, at least about 65%, at least about 70%, at least about 75%, at least about 80%, at least about 85%, or at least about 90% of the energy generated from combustion of the volume of fuel can be generated while the volume of fuel is being injected into the combustion chamber. In some embodiments, no more than about 95%, no more than about 90%, no more than about 85%, no more than about 80%, no more than about 75%, no more than about 70%, no more than about 65%, no more than about 60%, no more than about 55%, no more than about 50%, no more than about 45%, no more than about 40%, no more than about 35%, or no more than about 30% of the energy generated from combustion of the volume of fuel can be generated while the volume of fuel is being injected into the combustion chamber. Combinations of the above-referenced percentages of the energy generated from combustion of the volume of fuel can be generated while the volume of fuel is being injected into the combustion chamber (e.g., at least about 40% and no more than about 95% or at least about 60% and no more than about 80%), inclusive of all values and ranges therebetween. In some embodiments, about 25%, about 30%, about 35%, about 40%, about 45%, about 50%, about 55%, about 60%, about 65%, about 70%, about 75%, about 80%, about 85%, about 90%, or about 95% of the energy generated from combustion of the volume of fuel can be generated while the volume of fuel is being injected into the combustion chamber.

In some embodiments, the volume of air can have a temperature of at least about 80° C., at least about 90° C., at least about 100° C., at least about 150° C., at least about 200° C., at least about 250° C., at least about 300° C., at least about 350° C., at least about 400° C., at least about 450° C., at least about 500° C., at least about 550° C., at least about 600° C., at least about 650° C., at least about 700° C., or at least about 750° C. upon initially being drawn into the combustion chamber. In some embodiments, the volume of air can have a temperature of no more than about 800° C., no more than about 750° C., no more than about 700° C., no more than about 650° C., no more than about 600° C., no more than about 550° C., no more than about 500° C., no more than about 450° C., no more than about 400° C., no more than about 350° C., no more than about 300° C., no more than about 250° C., no more than about 200° C., no more than about 150° C., no more than about 100° C., or no more than about 90° C. upon initially being drawn into the combustion chamber. Combinations of the above-referenced temperatures of the volume of air upon initially being drawn into the combustion chamber are also possible (e.g., at least about 80° C. and no more than about 800° C. or at least about 200° C. and no more than about 600° C.), inclusive of all values and ranges therebetween. In some embodiments, the volume of air can have a temperature of about 80° C., about 90° C., about 100° C., about 150° C., about 200° C., about 250° C., about 300° C., about 350° C., about 400° C., about 450° C., about 500° C., about 550° C., about 600° C., about 650° C., about 700° C., about 750° C., or about 800° C. upon initially being drawn into the combustion chamber. In some embodiments, the volume of fuel can produce, upon continued injection, a mixing-limited plume. In some embodiments, the volume of fuel and the volume of air can combine in a chemical reaction in the mixing-limited plume.

In some embodiments, a delay between the initial injection of the volume of fuel into the combustion chamber and the onset of combustion can be less than about 5 ms, less than about 4.9 ms, less than about 4.8 ms, less than about 4.7 ms, less than about 4.6 ms, less than about 4.5 ms, less than about 4.4 ms, less than about 4.3 ms, less than about 4.2 ms, less than about 4.1 ms, less than about 4 ms, less than about 3.9 ms, less than about 3.8 ms, less than about 3.7 ms, less than about 3.6 ms, less than about 3.5 ms, less than about 3.4 ms, less than about 3.3 ms, less than about 3.2 ms, less than about 3.1 ms, less than about 3 ms, less than about 2.9 ms, less than about 2.8 ms, less than about 2.7 ms, less than about 2.6 ms, less than about 2.5 ms, less than about 2.4 ms, less than about 2.3 ms, less than about 2.2 ms, less than about 2.1 ms, less than about 2 ms, less than about 1.9 ms, less than about 1.8 ms, less than about 1.7 ms, less than about 1.6 ms, less than about 1.5 ms, less than about 1.4 ms, less than about 1.3 ms, less than about 1.2 ms, less than about 1.1 ms, less than about 1 ms, less than about 0.9 ms, less than about 0.8 ms, less than about 0.7 ms, less than about 0.6 ms, or less than about 0.5 ms, inclusive of all values and ranges therebetween.

In some embodiments, the method 10 can include opening and closing the exhaust valve to exhaust combusted fuel, uncombusted fuel, excess air, and/or other gases or liquids. In some embodiments, the exhaust valve can be opened at an engine crank angle of at least about 460°, at least about 465°, at least about 470°, at least about 475°, at least about 480°, at least about 485°, at least about 490°, at least about 495°, at least about 500°, or at least about 505°. In some embodiments, the exhaust valve can be opened at an engine crank angle of no more than about 510°, no more than about 505°, no more than about 500°, no more than about 495°, no more than about 490°, no more than about 485°, no more than about 480°, no more than about 475°, no more than about 470°, or no more than about 465°. Combinations of the above-referenced engine crank angles for the opening of the exhaust valve are also possible (e.g., at least about 460° and no more than about 510° or at least about 470° and no more than about 490°), inclusive of all values and ranges therebetween. In some embodiments, the exhaust valve can be opened at an engine crank angle of about 460°, about 465°, about 470°, about 475°, about 480°, about 485°, about 490°, about 495°, about 500°, about 505°, or about 510°.

In some embodiments, the closing of the exhaust valve can be timed to trap exhaust gas in the combustion chamber to aid in thermal management. In some embodiments, the closing of the exhaust valve can be timed to re-introduced exhaust gas into the combustion chamber to aid in thermal management. In some embodiments, the exhaust valve can be closed at an engine crank angle of at least about −20°, at least about −15°, at least about −10°, at least about −5°, at least about 0°, at least about 5°, or at least about 10°. In some embodiments, the exhaust valve can be closed at an engine crank angle of no more than about 15°, no more than about 10°, no more than about 5°, no more than about 0°, no more than about −5°, no more than about −10°, or no more than about −15°. Combinations of the above-referenced engine crank angles for the closing of the exhaust valve are also possible (e.g., at least about −20° and/or no more than about 15° or at least about −10° and no more than about 5°), inclusive of all values and ranges therebetween. In some embodiments, the exhaust valve can be closed at an engine crank angle of about −20°, about −15°, about −10°, about −5°, about 0°, about 5°, about 10°, or about 15°.

In some embodiments, the method 10 can include injecting and combusting additional fuel at step 17. In some embodiments, a first fuel can be injected during step 15, and a second fuel can be injected during step 17, the second fuel having a different cetane number, heating value, and/or chemical composition from the first fuel. In some embodiments, the second fuel can be injected during a different engine cycle than the first fuel. In some embodiments, the second fuel can be subject to the same or substantially similar steps as those described above with reference to the first fuel. In other words, the method 10 can include opening the intake valve to draw a volume of air into the combustion chamber, optionally applying a temperature control strategy, closing the intake valve, moving the piston from BDC to TDC, injecting a volume of the second fuel into the combustion chamber, and combusting substantially all of the volume of the second fuel. In some embodiments, the second fuel can be subject to the same or substantially similar parameters (e.g., engine crank angle upon fuel injection, pressure of fuel upon injection, ignition delay, etc.) as those described above with reference to the first fuel.

In some embodiments, the second fuel can have a different cetane number from the first fuel. In some embodiments, the second fuel can have a higher cetane number than the first fuel. In some embodiments, the second fuel can have a lower cetane number than the first fuel. In some embodiments, the second fuel can have a cetane number of at least about −5, at least about 0, at least about 5, at least about 10, at least about 15, at least about 20, at least about 25, at least about 30, at least about 35, at least about 40, at least about 45, at least about 50, at least about 55, at least about 60, or at least about 65. In some embodiments, the second fuel can have a cetane number of no more than about 70, no more than about 65, no more than about 60, no more than about 55, no more than about 50, no more than about 45, no more than about 40, no more than about 35, no more than about 30, no more than about 25, no more than about 20, no more than about 15, no more than about 10, no more than about 5, or no more than about 0. Combinations of the above-referenced cetane numbers of the second fuel are also possible (e.g., at least about −5 and no more than about 70 or at least about 20 and no more than about 50), inclusive of all values and ranges therebetween. In some embodiments, the second fuel can have a cetane number of about −5, about 0, about 5, about 10, about 15, about 20, about 25, about 30, about 35, about 40, about 45, about 50, about 55, about 60, about 65, or about 70.

In some embodiments, the second fuel can have a different octane number from the first fuel. In some embodiments, the second fuel can have a lower octane number than the first fuel. In some embodiments, the second fuel can have a higher octane number than the first fuel. In some embodiments, the second fuel can have an octane number of at least about 40, at least about 45, at least about 50, at least about 55, at least about 60, at least about 65, at least about 70, at least about 75, at least about 80, at least about 85, at least about 90, at least about 95, at least about 100, at least about 105, at least about 110, at least about 115, at least about 120, at least about 125, at least about 130, or at least about 135. In some embodiments, the fuel can have an octane number of no more than about 140, no more than about 135, no more than about 130, no more than about 125, no more than about 120, no more than about 115, no more than about 110, no more than about 105, no more than about 100, no more than about 95, no more than about 90, no more than about 85, no more than about 80, no more than about 75, no more than about 70, no more than about 65, no more than about 60, no more than about 55, no more than about 50, or no more than about 45. Combinations of the above-referenced octane numbers are also possible (e.g., at least about 40 and no more than about 140 or at least about 70 and no more than about 110, inclusive of all values and ranges therebetween. In some embodiments, the fuel can have an octane number of about 40, about 45, about 50, about 55, about 60, about 65, about 70, about 75, about 80, about 85, about 90, about 95, about 100, about 105, about 110, about 115, about 120, about 125, about 130, about 135, or about 140.

In some embodiments, a sensor can adjust conditions in the engine based on the fuel being injected. In some embodiments, the sensor can have the same or substantially similar properties to the sensor 272, as described above with reference to FIG. 2. In some embodiments, conditions of the combustion can be adjusted based on the type of fuel being injected. In some embodiments, the parameters of the temperature control mechanism can be modified based on the type of fuel being injected. For example, if the second fuel has a higher cetane number than the first fuel, the intensity of the heat applied to the volume of air prior to injection can be reduced, as the temperature inside the combustion chamber would not have to be as high to facilitate a timely ignition (e.g., less than about 2 ms) of the second fuel. In some embodiments, the crank angle at fuel injection can be modified based on the type of fuel being injected. In some embodiments, the composition of the volume of air drawn into the combustion chamber can change based on the type of fuel being injected. For example, a fuel with a higher cetane number may not have to be mixed with a volume of air with as high of a level of oxygen enrichment as a lower cetane fuel in order to ignite timely. In some embodiments, the pressure in the combustion chamber can be modified based on the type of fuel being injected.

In some embodiments, the first fuel can be injected during a first time period and the second fuel can be injected during a second time period. In some embodiments, the first time period can have substantially no overlap with the second time period. In some embodiments, the first time period can have a partial overlap with the second time period. In other words, the first fuel can be phased out while the second fuel is phased in. In some embodiments, the first time period can have a substantial overlap with the second time period. In some embodiments, an overlap period between the first time period and the second time period can be at least about 0.1 seconds, at least about 0.2 seconds, at least about 0.3 seconds, at least about 0.4 seconds, at least about 0.5 seconds, at least about 0.6 seconds, at least about 0.7 seconds, at least about 0.8 seconds, at least about 0.9 seconds, at least about 1 second, at least about 2 seconds, at least about 3 seconds, at least about 4 seconds, at least about 5 seconds, at least about 6 seconds, at least about 7 seconds, at least about 8 seconds, or at least about 9 seconds. In some embodiments, the overlap period between the first time period and the second time period can be no more than about 10 seconds, no more than about 9 seconds, no more than about 8 seconds, no more than about 7 seconds, no more than about 6 seconds, no more than about 5 seconds, no more than about 4 seconds, no more than about 3 seconds, no more than about 2 seconds, no more than about 1 second, no more than about 0.9 seconds, no more than about 0.8 seconds, no more than about 0.7 seconds, no more than about 0.6 seconds, no more than about 0.5 seconds, no more than about 0.4 seconds, no more than about 0.3 seconds, or no more than about 0.2 seconds. Combinations of the above-referenced overlap periods between the first time period and the second time period are also possible (e.g., at least about 0.1 seconds and no more than about 10 seconds or at least about 0.3 seconds and no more than about 0.5 seconds), inclusive of all values and ranges therebetween. In some embodiments, the overlap period between the first time period and the second time period can be about 0.1 seconds, about 0.2 seconds, about 0.3 seconds, about 0.4 seconds, about 0.5 seconds, about 0.6 seconds, about 0.7 seconds, about 0.8 seconds, about 0.9 seconds, about 1 second, about 2 seconds, about 3 seconds, about 4 seconds, about 5 seconds, about 6 seconds, about 7 seconds, about 8 seconds, about 9 seconds, or about 10 seconds.

In some embodiments, the method 10 can further include injecting and combusting a third fuel, the third fuel different from the first fuel and the second fuel. In some embodiments, the method 10 can include injecting and combusting a fourth, a fifth, a sixth, a seventh, an eighth, a ninth, a tenth fuel, an eleventh fuel, a twelfth fuel, a thirteenth fuel, a fourteenth fuel, a fifteenth fuel, a sixteenth fuel, a seventeenth fuel, an eighteenth fuel, a nineteenth fuel, a twentieth fuel, or any number of additional fuels.

In some embodiments, an engine can employ the strategies described herein in parallel. While independent use of each of these methods is possible, their combination is within the scope of this disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, "fuel" can refer to any material capable of producing an exothermic chemical reaction with an intake mixture, regardless of the fuel's cetane number. This can include fuels and blends of: naphtha, gasoline, alcohol fuels (including butanol, propanol, ethanol, and methanol), gaseous hydrocarbons (including natural gas, methane, ethane, propane, butane, hexane, etc.) and alternative fuels such as hydrogen, ammonia, syngas, CO, etc.

As used herein, "plume" can refer to a mass of fuel spreading from an injection point, which may be entraining or mixing with the volume of air as it progresses spatially and/or temporally during a fuel injection event.

As used herein, a numerical definition of a "crank angle" or an "engine crank angle" should be understood as the crank angle relative to the TDC position between the exhaust stroke and the intake stroke (as described below in Table 1). In other words, the engine crank angle is 0° (or 720°) when the piston is in the TDC position between the exhaust stroke and the intake stroke. The engine crank angle is 360° when the piston is in the TDC position between the compression stroke and the expansion stroke. The engine crank angle is 540° when the piston is in the BDC position between the expansion stroke and the exhaust stroke. The engine crank angle is 180° when the piston is in the BDC position between the intake stroke and the compression stroke. Negative numbers can also be used to describe the crank angle relative to the TDC position between the exhaust stroke and the intake stroke. In other words, 540° can also be described as −180°, 360° can also be described as −360°, and 180° can also be described as −540°.

TABLE 1

Crank Angle Descriptions

| Crank Angle (Degrees) | Piston Position | Stroke Description |
|---|---|---|
| 360 (−360) | TDC | Between compression stroke and expansion stroke. In some literature, this crank angle is referred to as "TDC Combustion" |
| Between 360 and 540 (Between −360 and −180) | Transitioning from TDC to BDC | Expansion stroke |
| 540 (−180) | BDC | Between expansion stroke and exhaust stroke |
| Between 540 and 720 (Between −180 and 0) | Transitioning from BDC to TDC | Exhaust stroke |
| 0 or 720 | TDC | Between exhaust stroke and intake stroke. In some literature, this crank angle is referred to as "TDC gas exchange" |
| Between 0 and 180 (Between −720 and −540) | Transitioning from TDC to BDC | Intake stroke |

TABLE 1-continued

Crank Angle Descriptions

| Crank Angle (Degrees) | Piston Position | Stroke Description |
| --- | --- | --- |
| 180 (−540) | BDC | Between intake stroke and compression stroke |
| Between 180 and 360 (Between −540 and −360) | Transitioning from BDC to TDC | Compression stroke |
| 360 (−360) | TDC | Between compression stroke and expansion stroke. In some literature, this crank angle is referred to as "TDC Combustion" |

In some embodiments, the term "immediately prior to ignition" or "just prior to ignition" can refer to a temporal point, at which the engine crank angle is about 300°, about 305°, about 310°, about 315°, about 320°, about 325°, about 330°, about 335°, about 340°, about 345°, about 350°, about 355°, about 360°, about 365°, about 370°, about 375°, or about 380°, inclusive of all values and ranges therebetween.

In some embodiments, the term "immediately prior to ignition" or "just prior to ignition" can refer to a temporal point preceding the time at which 5% of the fuel exothermicity is observed to have happened. In other words, the fuel can be considered to have ignited when a measurable deviation in pressure could be detected to indicate exothermic fuel oxidation is occurring.

In some embodiments, the term "immediately prior to ignition" or "just prior to ignition" can refer to a temporal point about 1 crank angle degree, about 2 crank angle degrees, about 3 crank angle degrees, about 4 crank angle degrees, about 5 crank angle degrees, about 6 crank angle degrees, about 7 crank angle degrees, about 8 crank angle degrees, about 9 crank angle degrees, about 10 crank angle degrees, about 11 crank angle degrees, about 12 crank angle degrees, about 13 crank angle degrees, about 14 crank angle degrees, about 15 crank angle degrees, about 16 crank angle degrees, about 17 crank angle degrees, about 18 crank angle degrees, about 19 crank angle degrees, or about 20 crank angle degrees prior to ignition, inclusive of all values and ranges therebetween.

In some embodiments, the term "immediately prior to fuel injection" or "just prior to fuel injection" can refer to a temporal point about 1 crank angle degree, about 2 crank angle degrees, about 3 crank angle degrees, about 4 crank angle degrees, about 5 crank angle degrees, about 6 crank angle degrees, about 7 crank angle degrees, about 8 crank angle degrees, about 9 crank angle degrees, about 10 crank angle degrees, about 11 crank angle degrees, about 12 crank angle degrees, about 13 crank angle degrees, about 14 crank angle degrees, about 15 crank angle degrees, about 16 crank angle degrees, about 17 crank angle degrees, about 18 crank angle degrees, about 19 crank angle degrees, or about 20 crank angle degrees prior to fuel injection, inclusive of all values and ranges therebetween.

In some embodiments, the term "valve closing" (e.g., "intake valve closing" or "exhaust valve closing") can refer to a temporal point, wherein the valve becomes fully seated (i.e., 0 mm valve lift). In some embodiments, the term "valve opening" (e.g., "intake valve opening" or "exhaust valve opening") can refer to a temporal point, wherein the valve becomes unseated (i.e., >0 mm lift).

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure. Where methods and steps described above indicate certain events occurring in a certain order, those of ordinary skill in the art having the benefit of this disclosure would recognize that the ordering of certain steps may be modified and such modification are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

The invention claimed is:

1. A method of operating a compression ignition engine, the method comprising:
 drawing a volume of air into a combustion chamber, the volume of air having a temperature between about 80° C. and about 150° C. while being drawn into the combustion chamber;
 moving a piston from a bottom-dead-center (BDC) position to a top-dead-center (TDC) position in the combustion chamber at a compression ratio of at least about 15:1;
 injecting a volume of a fuel into the combustion chamber at an engine crank angle, the fuel having a cetane number less than about 40;
 igniting the volume of the fuel in the combustion chamber; and
 combusting the volume of the fuel in the combustion chamber,
 wherein a delay between initiation of injection of the volume of the fuel into the combustion chamber and initiation of combustion is less than about 1 ms, and
 wherein the engine crank angle is greater than about 330 degrees by a sufficient margin such that no more than about 50% of the volume of the fuel is pre-mixed with the volume of air upon initiation of combustion.

2. The method of claim 1, wherein the combustion chamber is a single vessel in which the igniting and the combusting of the volume of the fuel occur.

3. The method of claim 1, wherein at least 30% of the energy generated from combusting the volume of the fuel is generated while the volume of the fuel is being injected into the combustion chamber.

4. The method of claim 1, wherein moving the piston from BDC to TDC is at a compression ratio between about 15:1 and about 25:1.

5. The method of claim 1, wherein the volume of the fuel produces, upon continued injection, a mixing-limited plume, reacting the volume of the fuel with the volume of air.

6. The method of claim 1, wherein the fuel has a cetane number of less than about 20.

7. The method of claim 1, wherein the volume of the fuel includes less than about 3 wt % of additives that affect cetane number.

8. The method of claim 1, wherein the fuel includes naphtha, alcohol, butanol, propanol, ethanol, methanol, gaseous hydrocarbons, natural gas, methane, ethane, propane, butane, hexane, alternative fuels, hydrogen, ammonia, syngas, and/or CO.

9. The method of claim 1, wherein the volume of the fuel is injected into the combustion chamber at a pressure of at least about 800 bar absolute.

10. The method of claim 1, wherein the engine crank angle is greater than about 330 degrees by a sufficient margin such that no more than about 20% of the volume of the fuel is pre-mixed with the volume of air upon initiation of combustion.

11. A method of operating a compression ignition engine, the method comprising:
drawing a volume of air into a combustion chamber;
moving a piston from a bottom-dead-center (BDC) position to a top-dead-center (TDC) position in the combustion chamber at a compression ratio of at least about 15:1;
injecting a volume of a fuel into the combustion chamber at an engine crank angle between about 330 degrees and about 365 degrees, the fuel having a cetane number less than about 40 and an octane number of at least 95, the fuel including less than about 500 ppm by weight of additives that affect cetane number;
igniting the volume of the fuel in the combustion chamber; and
combusting the volume of the fuel in the combustion chamber,
wherein a delay between initiation of injection of the volume of the fuel into the combustion chamber and initiation of combustion is less than about 2 ms, and
wherein the engine crank angle is greater than about 330 degrees by a sufficient margin such that at least about 30% of the energy generated from combusting the volume of the fuel is generated while the volume of the fuel is generated while the volume of the fuel is being injected into the combustion chamber.

12. The method of claim 11, wherein the combustion chamber is a single vessel in which the igniting and the combusting of the volume of the fuel occur.

13. The method of claim 11, wherein the combustion chamber includes points with local equivalence ratios of at least about 2.

14. The method of claim 11, further comprising:
applying a temperature control strategy to the volume of air prior to drawing the volume of air into the combustion chamber.

15. The method of claim 14, wherein the temperature control strategy includes exposing the volume of air to a burner with flame stabilization and/or a catalytic burner.

16. The method of claim 14, wherein the temperature control strategy includes at least partial retention and recirculation of the exhaust gas.

17. The method of claim 11, wherein the moving the piston from BDC to TDC is at a compression ratio is between about 15:1 and about 25:1.

18. The method of claim 11, wherein the fuel has a cetane number of less than about 20.

19. The method of claim 11, wherein the volume of the fuel includes less than about 3 wt % of additives that affect cetane number.

20. The method of claim 11, wherein the engine crank angle is greater than about 330 degrees by a sufficient margin such that no more than about 20% of the volume of the fuel is pre-mixed with the volume of air upon initiation of combustion.

21. The method of claim 11, wherein the fuel includes at least one of naphtha, alcohol, butanol, propanol, ethanol, methanol, gaseous hydrocarbons, natural gas, methane, ethane, propane, butane, hexane, alternative fuels, hydrogen, ammonia, syngas, or CO.

22. A method of operating a compression ignition engine, the method comprising:
drawing a volume of air into a combustion chamber;
moving a piston from a bottom-dead-center (BDC) position to a top-dead-center (TDC) position in the combustion chamber at a compression ratio of at least about 15:1;
injecting a volume of a fuel into the combustion chamber, the fuel having a cetane number less than about 40 and an octane number of at least 95;
igniting the volume of the fuel in the combustion chamber; and
combusting the volume of the fuel in the combustion chamber,
wherein the combustion chamber is a single vessel in which the igniting and the combusting of the volume of the fuel occur, and
wherein the volume of air has a temperature sufficiently high while being drawn into the combustion chamber, such that a delay between initiation of injection of the volume of the fuel into the combustion chamber and initiation of combustion is less than about 1 ms.

23. The method of claim 22, wherein changing the injection timing of the volume of the fuel can control a rate of pressure rise from the combustion of the volume of the fuel in to be less than about 15 bar per degree of crank angle.

24. The method of claim 22, wherein at least 30% of the energy generated from combusting the volume of the fuel is generated while the volume of the fuel is being injected into the combustion chamber.

25. The method of claim 22, wherein the moving the piston from BDC to TDC is at a compression ratio is between about 15:1 and about 25:1.

26. The method of claim 22, wherein the fuel has a cetane number of less than about 20.

27. The method of claim 22, wherein the volume of the fuel includes less than about 3 wt % of additives that affect cetane number.

28. The method of claim 22, wherein the injecting is at an engine crank angle greater than about 330 degrees by a sufficient margin such that no more than about 50% of the volume of the fuel is pre-mixed with the volume of air upon initiation of combustion.

29. The method of claim 22, wherein the volume of the fuel is injected into the combustion chamber at a pressure of at least about 800 bar absolute.

30. The method of claim 22, wherein the fuel includes at least one of naphtha, alcohol, butanol, propanol, ethanol, methanol, gaseous hydrocarbons, natural gas, methane, ethane, propane, butane, hexane, alternative fuels, hydrogen, ammonia, syngas, or CO.

* * * * *